United States Patent
Ando et al.

(10) Patent No.: US 7,374,278 B2
(45) Date of Patent: May 20, 2008

(54) WATER-BASED INK CONTAINING COLORED MICROPARTICLE DISPERSION

(75) Inventors: Hiroaki Ando, Hino (JP); Kazuyoshi Shioiri, Kyoto (JP)

(73) Assignee: Konica Minolta Holdings, Inc., Tokyo (JP)

( * ) Notice: Subject to any disclaimer, the term of this patent is extended or adjusted under 35 U.S.C. 154(b) by 790 days.

(21) Appl. No.: 10/789,321

(22) Filed: Feb. 26, 2004

(65) Prior Publication Data
US 2004/0176498 A1 Sep. 9, 2004

(30) Foreign Application Priority Data
Mar. 5, 2003 (JP) .............................. 2003-058324

(51) Int. Cl.
*G01D 11/00* (2006.01)
(52) U.S. Cl. ..................... 347/100; 347/95; 523/160
(58) Field of Classification Search ................ 347/100, 347/95, 96, 101; 106/31.27, 31.6, 31.13; 523/160
See application file for complete search history.

(56) References Cited

U.S. PATENT DOCUMENTS

| 5,100,471 A | * | 3/1992 | Winnik et al. ............... 347/100 |
| 6,142,618 A | * | 11/2000 | Smith et al. .................. 347/85 |
| 2003/0055115 A1 | * | 3/2003 | Ninomiya et al. ............ 516/77 |
| 2004/0131855 A1 | * | 7/2004 | Ganapathiappan .......... 428/407 |

FOREIGN PATENT DOCUMENTS

JP 10-298476 * 11/1998

\* cited by examiner

*Primary Examiner*—Manish S. Shah
(74) *Attorney, Agent, or Firm*—Frishauf, Holtz, Goodman & Chick, P.C.

(57) ABSTRACT

A water-based ink including a colored microparticle dispersion having water and a microparticle containing a resin and a colorant, wherein the microparticle has a core part and a shell part to form a core-shell structure and the core part and the shell part are cross-linked with a cross-linking agent.

7 Claims, No Drawings

WATER-BASED INK CONTAINING COLORED MICROPARTICLE DISPERSION

TECHNICAL FIELD

The present invention relates to a minute colored particle (or called as a colored microparticle) dispersion in which the colored microparticle has a core/shell structure, and at least two layers have a crosslinking structure, and to a colored microparticle dispersion which makes it possible to prepare ink which exhibits high solvent resistance, when a water-based ink is prepared employing the aforesaid colored microparticle dispersion.

BACKGROUND

In recent years, widely employed as recording materials employed for printers, printing presses, markers and writing means, inking materials, and especially as ink-jet ink, are those comprised of an aqueous solution of water-soluble dyes as a main component, and those comprised of a minute pigment particle dispersion as a main component.

Ink employing water-soluble dyes results in brighter color reproduction, compared to pigment ink. However, when compared to pigment ink, bleeding tends to occur on recording paper sheets due to the fact that the ink is comprised of an aqueous dye solution, and water resistance is also inferior to pigment ink. Further, problems occur in which lightfastness is much lower than pigment ink. On the other hand, many efforts have been made to improve water resistance and lightfastness of pigment ink. However, it is hard to mention that problems of pigment ink have sufficiently been solved.

Contrary to this, water-based ink which is prepared by coloring water-dispersible resins with oil-soluble dyes or hydrophobic dyes to be usable as a water-based dispersion, namely water-based ink employing minute colored polymer particles as a recording material is expected to be one which is used in place of the aforesaid ink employing water-soluble dyes. Heretofore, investigations have been conducted regarding various aspects such as dyes, polymer compositions, a decrease in size of colored microparticles, or constitutions.

For example, Japanese Patent Publication Open to Public Inspection (hereinafter referred to as JP-A) No. 54-58504 discloses ink which is prepared by dispersing a mixture consisting of a hydrophobic dye solution and minute vinyl polymer particles in the form of an oil-in-water type; JP-A Nos. 55-139471, 3-250069, and 54-58504 describe ink employing emulsion polymerization or dispersion polymerization particles colored with dyes; JP-A No. 2001-98194 discloses ink comprised of copolymer resins comprised of a hydrophilic polymerization chain portion and a hydrophobic polymerization chain portion; JP-A No. 2000-191968 discloses ink in which vinyl polymer polymerizable unsaturated acid monomers, a hydroxyl group containing monomers, and styrene macromers are employed; JP-A No. 9-1575098 discloses ink in which polyester resins containing cyclohexanedicarboxylic acid are employed; and U.S. Pat. No. 6,384,108 discloses minute particles which are formed by dissolving self-emulsification type polymers in solvents together with dyes and emulsifying the resulting mixture in a water phase.

However, all these minute particles are employed in ink, while mixed with various water-based organic solvents. As a result, when colored microparticles prepared by these methods are employed to prepare ink-jet ink, major problems occur due to insufficient solvent resistance.

On the other hand, in order to overcome the problems due to insufficient solvent resistance, surface crosslinked core/shell particles are disclosed (Patent Document 1). Herein, it is intended that the solvent resistance is enhanced through crosslinking of resins. However, mere surface crosslinking does not result in enhancement of solvent resistance as desired. In addition, problems occur in which, since polymerization is carried out in such a manner that dyes are dissolved in monomers, dyes exhibit a relatively large polymerization inhibiting action and particles tend to coagulate due to crosslinking among the particles when the particle surface is subjected to crosslinking to increase the molecular weight.

Further, polymer particles are described which are provided with a self-emulsification property by an ionic group and are crosslinked via a urethane bond (Patent Document 2). Herein, in the same manner as above, the molecular weight is increased through crosslinking and the solvent resistance of colored microparticles is enhanced. When crosslinking is effectively introduced, the solvent resistance is enhanced due to an increase in the molecular weight of resins. However, no description is made regarding more effective enhancement of the solvent resistance utilizing the core/shell structure.

As noted above, only by introducing crosslinking into the resins of colored microparticles or simply crosslinking the surface of core/shell particles, the resulting enhancement of solvent resistance is not as effective as desired. As a result, colored microparticles which satisfy all performance at a desired balance have not been prepared.

SUMMARY OF THE INVENTION

Consequently, an object of the present invention is to provide a minute core/shell structured and crosslinked colored particle dispersion which results in excellent solvent resistance and exhibits improved dispersion stability, and to provide a water-based ink and an ink-jet ink employing the aforesaid colored microparticle dispersion.

The object of the present invention is achieved employing the following embodiments.

(1) A water-based ink comprising a colored microparticle dispersion having water and a microparticle containing a resin and a colorant, wherein the microparticle has a core part and a shell part to form a core-shell structure and the core part and the shell part are cross-linked with a cross-linking agent.

(2) The water-based ink of Item 1, wherein the resin contained in the microparticle has a group represented by General Formula (A):

$$\text{-Z-R} \qquad \text{General Formula (A)}$$

wherein R is a hydrogen atom, a hydroxy group, an alkyl group, an aryl group or a heterocyclic group; Z is a block polymer unit or a random polymer unit containing an ethylene oxide group or a propylene oxide group, a molecular weight of Z being from 88 to 30000.

(3) The water-based ink of Item 1, wherein a polymerizable emulsifying compound is used to prepare the colored microparticle dispersion.

(4) The water-based ink of Item 1, wherein a volume average diameter of the microparticles is 10 to 100 nm.

(5) The water-based ink of Item 1, wherein a variation coefficient of the volume average diameter of the microparticles is not more than 80%.

(6) An ink-jet ink containing the water-based ink of Item 1.
(7) A method of preparing the colored microparticle dispersion of claim 1, wherein the cross-linked core-shell particle is prepared by the method comprising the steps of:
  (i) dissolving a colorant and a resin in a water-insoluble organic solvent to obtain a colorant solution;
  (ii) mixing the colorant solution with water and an emulsifying agent so as to obtain a colorant emulsion; and
  (iii) adding a cross-linking agent to the colorant emulsion so as to form the cross-linked core-shell particle.
(8) A method of forming an image, comprising the step of ejecting a droplet of the ink-jet ink of claim 6 through an ink-jet head in accordance with a digital signal onto an ink receiving sheet.

DESCRIPTION OF THE PREFERRED EMBODIMENTS

The present invention will now be detailed below.

The inventors of the present invention investigated minute core/shell structure colored particles (as a dispersion). During the investigations, regarding resins which were employed to prepare a core comprising colorants or a shell which was formed on its exterior, introduction of crosslinking was studied. As a result, in view of solvent resistance and dispersion stability, in minute core/shell structure colored particles, it was discovered that a colored microparticle dispersion which satisfied the desired solvent resistance, dispersion stability and other performance at a desired balance was prepared by introducing a crosslinked structure into each of at least two of a core and shells which were formed on the exterior of the core (heretofore, no suggestion has been made to introduce a crosslinked structure into both of a core and a shell).

In a water-based ink which is prepared by coloring water-dispersible resins with oil-soluble dyes or hydrophobic dyes to be used as a water-based dispersion, namely a water-based ink employing minute colored polymer particles as a recording material, production methods of the aforesaid colored microparticle dispersion include one in which polymers and dyes are dissolved in solvents, and emulsified followed by the removal of the aforesaid solvents.

In this method, when high molecular weight resins with desired solvent resistance are employed, the resulting colored microparticles cause problems such as insufficient solubility in solvents and insufficient dispersion stability due to a decrease in compatibility with colorants.

Further, there is a method in which dyes are dissolved in monomers which are employed to prepare resins, and the resulting mixture undergoes polymerization without any modification. However, polymerization proceeds not always as desired due to the polymerization inhibiting action of dyes. Consequently, the inventors of the present invention studied a method to achieve dispersion stability employing shell polymers in such a manner that by employing polymers which exhibited high solubility of dyes, dye containing cores were formed and subsequently covered by shell polymers. When the compatibility of the core polymers with oil-soluble dyes was degraded, phase separation from the dyes occurred, whereby the dispersion stability of the entire particles was degraded. Accordingly, it was possible to introduce a crosslinking structure into the core polymers (by which the solvent resistance of the core is enhanced). However, excessive crosslinking resulted in degradation of the compatibility with dyes. For example, dyes resulted in phase separation due to an increase in molecular weight of polymers derived by excessive crosslinking. The shell polymers contributed, through shell formation, to minimization of particle coagulation as well as an increase in the surface hydrophilicity of dispersed particles. However, when only the shell was crosslinked, it was difficult to retard excessive swelling of the core. In addition, enhancement of solvent resistance was limited. As a result, when brought into contact with water-soluble solvents, coagulation occurred and in extreme cases, the core/shell structure was destroyed. As a result, it was necessary that the core underwent crosslinking to some extent, whereby it was possible to minimize coagulation and destruction of core/shell particles. As a result, it was possible to achieve enhancement of solvent resistance, which was barely achieved by only shell crosslinking. Further, in the present invention, in order to enhance stability of dispersed particles and coagulation minimizing effects by shell formation via incorporation of dyes into the core, regarding the core, it is possible to carry out selection based mainly on compatibility with dyes. Further, regarding the shell composition, it is possible to further minimize coagulation due to crosslinking among particles during crosslinking by, for example, introducing a steric hindrance forming group.

Further, when the core is initially crosslinked, a steric hindrance forming group may be introduced into polymers employed to form the core, or the core may be formed employing steric hindrance forming emulsifiers.

Accordingly, the present invention relates to a colored microparticle dispersion which is prepared by mixing colorants and resins, and subsequently dispersing the resulting mixture into water, namely a colored microparticle dispersion which is prepared in such a manner that colorants and resins are mixed, and after dissolving the resulting mixture in water-insoluble organic solvents, the resulting solution is emulsify-dispersed into a water-based liquid composition employing emulsifiers. The aforesaid colored microparticle dispersion is characterized in that the colored microparticles incorporated into the aforesaid colored microparticle dispersion has a core/shell structure of at least two layers, and are comprised of a core which forms an colorant containing inner nucleus and at least one shell which is formed the exterior, and each of at least two of the aforesaid core and shells has a crosslinking structure.

As noted above, an increase in molecular weight by crosslinking only shells results in coagulation or particle destruction when the inner core has no crosslinking and swelling due to solvents increases. As a result, it is preferable to provide another crosslinked shell which retards an increase in the diameter of the core due to swelling.

Further, the particularly preferable case is that a dye-containing core has a crosslinking structure, and in addition, one of the shells, especially the outermost shell has a crosslinking structure.

As noted above, in the present invention, when a colored microparticle dispersion containing dyes as well as resins (polymers) is prepared, a method is well known in which dyes and resins (polymers) are dissolved in organic solvents, and the resulting mixture is emulsify-dispersed into a water phase, further followed by removal of the organic solvents. Since ink-jet ink is required to be comprised of minute particles, in order to decrease the diameter of the emulsified particle of the core (for example, a particle diameter of at most 100 nm), it is not possible to excessively increase the molecular weight of core polymers. Further, in order to achieve the desired compatibility with colorants, it is desirous that the molecular weight of the core polymers is not excessively large. As a result, in order to allow crosslinking in the core, a method is preferred in which mixing, dissolving and dispersion in the presence of dyes are previously carried out and crosslinking is performed during or after emulsification. When crosslinking is initiated from the beginning, in view of solubility or swellability in solvents, or affinity (uniform dissolution and dispersion in resins) to dyes, it is difficult to use resins resulting in a crosslinked structure due to a large molecular weight, and the resulting colored microparticle dispersion results in limited improvement of solvent resistance.

Consequently, it is preferable that colorants and resins are dissolved in water-insoluble organic solvents and the aforesaid crosslinking structure is formed after emulsify-dispersing the resulting solution into a water-based liquid employing emulsifiers.

Further, it is also preferable that after the formation of shells, they undergo crosslinking.

In the present invention, reaction which forms a crosslinking structure in the core or shell after dispersion proceeds in such a manner that resins (being polymers), which are prepared by copolymerization, or condensation (later, may be introduced as a pendant group) of monomers having a group capable of forming a bond to constitute a crosslinking structure in the resulting polymer with other monomers, are brought into contact with crosslinking compounds to form a crosslinking bond.

For example, an isocyanate group as a functional group forming a crosslinking is introduced into polymers by copolymerizing monomers such as Karenz MOI (manufactured by Showa Denko K.K.) having an isocyanate group in the molecule with other polymerizable components such as acrylic acid esters. Polymers having an isocyanate group, prepared as above, are dissolved in solvents such as ethyl acetate together with dyes, and a water-based dispersion is formed by dispersing the resulting mixture into a water-based medium. Subsequently, the resulting dispersion is treated, for example, with amines, and preferably primary amines, so that the isocyanate group in the polymer reacts with amines to form a ureido group, followed by three-dimensional crosslinking among the polymers.

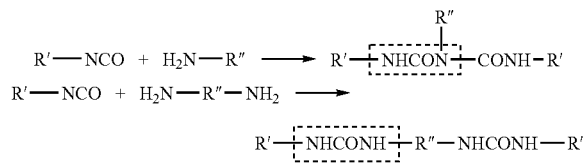

wherein R' represents a polymer residual group which is bonded to an isocyanate group, and R" also represents an amine residual group (the same in the following descriptions).

Further, of the aforesaid amines, preferably employed as crosslinking agents are diamines (for example, hexamethylenediamine and diethylenetriamine) which have at least two reaction points with an isocyanate group, as well as amines having a hydroxyl group such as aminopropanol. Of these, preferred are amines having a hydroxyl group. For example, in the case of aminopropanol, the amine group reacts with the isocyanate group in polymers to form a ureido bond (being a carbamoylamino group), while the hydroxyl group reacts with the same to form a urethane bond (being a carbamoyloxy group).

When the aforesaid polymers having an isocyanate group are employed, used as preferable crosslinking agents are compounds such as 3-aminopropanol or hydroxyethylaminopropylamine, other than the aforesaid primary amines.

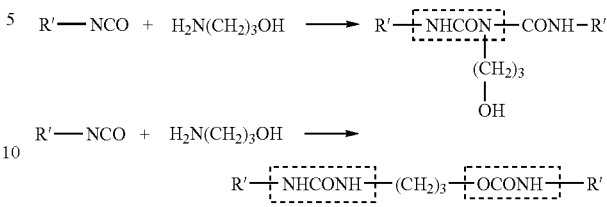

Further, on the contrary, when polymers have, for example, a hydroxyl group at the side chain, multifunctional compounds such as those having a plurality of isocyanate groups may undergo reaction, as a crosslinking compound (being a crosslinking agent) with the aforesaid polymers. As such combinations, for example, it is possible to form the same urethane bond (being a carbamoyloxy bond), even though the resulting bond state is reversed when viewed from the polymer, by crosslinking an acryl based resin comprised of hydroxyethyl acrylate (HEMA), having an active hydrogen such as a hydroxyl group, with crosslinking agents such as multifunctional isocyanates, for example, the Coronate Series, manufactured by Nippon Polyurethane Industry Co., Ltd. and the Desmodule Series, manufactured by Sumitomo Bayer Co.

Herein, for convenience, such a ureido bond and a urethane bond are collectively called a urethane bond.

As previously described, employed as crosslinking agents may be compounds having a plurality of hydrogen atoms which are active for functional groups such as an isocyanate group. Further, contrary to this, when polymers having an active hydrogen atom are employed, multifunctional compounds may be employed as a crosslinking compound.

Other than the aforesaid urethane bond, representatively listed as crosslinking groups (or reactions) are the groups or reactions below. A crosslinking reaction is a reaction of active hydrogen atoms with hydrogen reactive functional groups. Thus, compounds having a plurality of active hydrogen atoms work as a crosslinking agent for polymers having a functional group. On the contrary, when polymers having active hydrogen atoms are employed, multifunctional groups work as a crosslinking agent.

For example, when a polymer (for example, a polymer comprised of glycidyl acrylate as a constituting component) having an epoxy group as a functional group is employed together with amines as a crosslinking agent, reaction occurs to form an imino group, whereby bridges are formed.

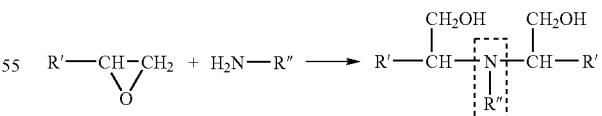

wherein R' also represents a polymer residual group, and R" represents an amine residual group.

Preferably employed as crosslinking agents for these are amines which are usable in cases of the aforesaid polymers having an isocyanate group.

Crosslinking reaction further includes formation of amido esters based on the reaction of a carboxyl group with an oxazoline group.

When carboxyl group containing polymers (for example, acrylic resins comprised of acrylic aid or methacrylic acid as a copolymerizing component) are employed, in order to increase the degree of polymerization of the aforesaid polymers, crosslinking reaction can be conducted employing, for example, the Epocross WS Series (manufactured by Nippon Shokubai Co.) which are oxazolone groups containing water-soluble polymers. As described below, an aminoester bond is formed to result in a crosslinking structure. Due to that, the molecular weight increases resulting in an increase in solvent resistance.

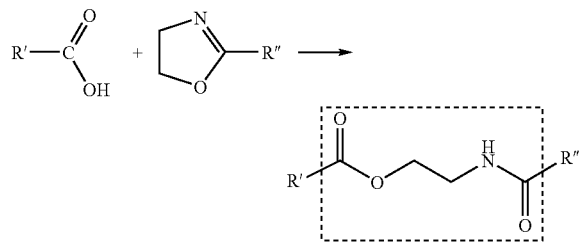

wherein R' also represents a polymer residual group, and R" represents a crosslinking agent residual group bonded to a reactive oxazolone group.

Further, crosslinking may be achieved through formation of hydrazide. It is possible to form a bridge via a hydrazone bond by employing active hydrogen atom containing hydrazide crosslinking agents having a structure of $H_2NHNCO-R''-CONHNH_2$ (wherein R" represents a divalent group such as an alkylene group), such as adipic acid hydrazide (ADH, manufactured by Kyowa Hakko Kogyo Co., Ltd.) together with acryl based polymers, as a colored microparticle dispersion resin, which has a monomer component (for example, diacetone acrylamide, manufactured by Kyowa Hakko Kogyo Co., Ltd.) having a functional group such as a carbonyl group as copolymerizing components.

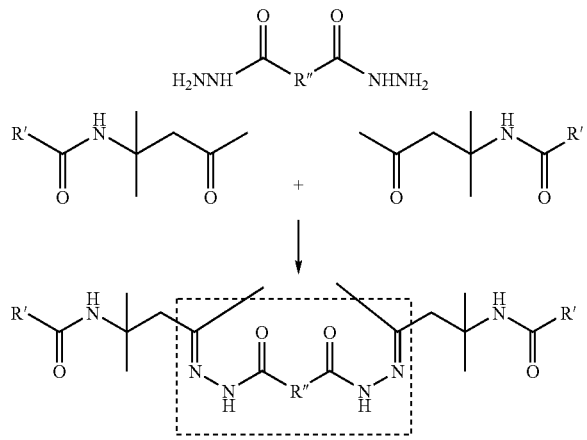

Cross-linking reaction is essentially the reaction of an active hydrogen atom with a functional group which is reactive with the active hydrogen atom. Such hydrogen atoms or functional groups may be in either a resin or a crosslinking agent. In the above, a typically used crosslinking reaction was described obviously, however, it is possible to use other crosslinking reactions. For example, other than the aforesaid glycidyl methacrylate, N-methylolacrylamide, having an N-methylol group, is considered as a monomer having a functional group.

Further, other than those described above, reaction components or groups which undergo crosslinking reaction may be employed in each of the polymers and crosslinking agents.

Still further, especially in the case of shell polymers, it is possible to simultaneously perform shell formation, as well as crosslinking reaction, employing multifunctional vinyl monomers.

Preferable examples of these multifunctional vinyl monomers include ethylene glycol dimethacrylate, ethylene glycol acrylate, and divinylbenzene.

Listed as crosslinking structure forming groups or combinations thereof in the present invention are those described above. However, the present invention is not limited thereto, and those can preferably be employed which result in an increase in molecular weight through crosslinking and desirably affect the Tg, solvent resistance, and swellability of resins.

In the present invention, it is possible to use various types of resins (being polymers) which constitute colored microparticles employed to form cores. It is preferable that the aforesaid resins (being polymers), in which at least one of them having a Tg of at least 10° C., is employed. Accordingly, resins (being polymers) usable in the present invention are polymers having the aforesaid functional group such as an isocyanate group or an epoxy group, or the polymers having active hydrogen atoms such as a hydroxyl group or a carboxyl group. Since monomers, which are employed as in each of the constituting components, are commercially available, copolymers are preferred which are prepared through copolymerization with polymerizable vinyl monomers. Such polymers, having a functional group or active hydrogen atoms, are readily synthesized employing any of the several conventional radical polymerization methods.

Listed as specific examples of preferable copolymerizable vinyl monomers which form copolymers together with the aforesaid vinyl monomers each having a functional group or an active hydrogen atom are, for example, vinyl monomers such as vinyl acetate, acrylic acid, methyl acrylate, ethyl acrylate, n-butyl acrylate, t-butyl acrylate, isononyl acrylate, dodecyl acrylate, octadecyl acrylate, 2-phenoxyethyl acrylate, methacrylic acid, methyl methacrylate, ethyl methacrylate, n-butyl methacrylate, isobutyl methacrylate, 2-ethylhexyl methacrylate, dodecyl methacrylate, octadecyl methacrylate, cyclohexyl methacrylate, stearyl methacrylate, benzyl methacrylate, 2-acetoacetoxyethyl methacrylate, triethylene glycol methacrylate, ethoxytriethylene glycol methacrylate, glycidyl methacrylate, phenyl methacrylate, styrene, α-methylstyrene, maleic acid, or acrylonitrile.

The proportion of each of the active hydrogen atoms or the monomer components having a functional group, which are employed to form a crosslinking bond, varies depending on the formed crosslinking structure (namely varies depending on the types of functional groups or crosslinking agents), but is commonly in the range of 0.1-30 percent by weight, and is preferably in the range of 0.3-15 percent by weight. When the aforesaid amount is excessively small, the effects of the present invention are not exhibited due to a decrease in the formation of the crosslinking bond, while when it is excessively large, interaction between the resins and dyes and affinity for solvents largely vary.

Employed as resins (being polymers) according to the present invention may be, other than those which contribute to the aforesaid crosslinking, monomers having a hydroxyl group and a carboxyl group, monomers having a hydrophilic group such as a sulfonic acid group, a phosphoric acid group, or a quaternary ammonium group, and monomers such as 2-acrylamido-2-methylpropanesulfonic acid or diethyl aminoethyl methacrylate in an amount of at most 20 percent by weight.

Polymers which have not undergone crosslinking are prepared by radically copolymerizing the aforesaid vinyl monomers having a functional group or active hydrogen atoms with these polymerizable vinyl monomers, employing any prior art method.

It is preferable that a steric hindrance incorporating group is introduced into the resins (being polymers) according to the present invention, which have not undergone crosslinking, so that crosslinking between particles is retarded during dispersion. In view of stability of particles, preferably as steric hindrance incorporating groups are hydrophilic groups such as long chain polyethylene oxides or polypropylene oxides. For example, preferred are resins which simultaneously have the structure represented by the General Formula (A) described below.

-Z-R     General Formula (A)

wherein R is a hydrogen atom, a hydroxy group, an alkyl group, an aryl group or a heterocyclic group; Z is a block polymer unit or a random polymer unit containing an ethylene oxide group or a propylene oxide group, a molecular weight of Z being from 88 to 30000.

More preferred resins represented by General Formula (A) are further represented by General Formula (1) described below.

-(EO)$_m$-(PO)$_n$-(TO)$_p$-R     General Formula (1)

wherein EO represents an ethylene oxide group, PO represents a polygene oxide group, and TO represents a tetramethylene oxide group, and each is subjected to random or block copolymerization; each of the ethylene oxide group, the propylene oxide group, and the tetramethylene oxide group represented by EO, PO, and TO, respectively, may be further substituted; each of m, n, and p is an integer of 0-500 in which $2 \leq m+n+p \leq 500$ is held; and R represents a substituent such as a hydrogen atom, an alkyl group, an aryl group, or a heterocyclic group, which is preferably a group having no active hydrogen atoms. Preferable groups may include a straight or branched chain alkyl group having 1-22 carbon atoms such as a methyl group, an ethyl group, or a butyl group, and an alicyclic group also having 1-22 carbon atoms such as a cyclopropyl group or a cyclopentyl group. These may be further substituted by another substituent, but the aforesaid substituents are preferably a group having no active hydrogen atoms. Aryl groups include a phenyl group and a naphthyl group, which may also be substituted by a substituent having no active hydrogen atoms. Further, listed as heterocyclic groups are those such as aziridine, pyrrolidine, furan, thiophene, pyrrole, pyrazole, imidazole, oxazole, thiazole, pyridine, or pyridazine, but they are not limited thereto. Preferred as the aforesaid heterocyclic groups are those having no active hydrogen atoms, and further, may have substituents which preferably have no active hydrogen atoms.

Resins having the hydrophilic group, represented by General Formula (1), such as polyethylene oxide or polypropylene oxide, which result in steric hindrance may be mixed and employed with resins having a functional group or active hydrogen atoms which are employed to form a crosslinking structure. However, preferred resins are those which have both a steric hindrance forming group such as polyethylene oxide or polypropylene oxide and a functional group or an active hydrogen atom which forms a crosslinking structure. It is preferable that a single polymer simultaneously has these groups in a uniform structure.

Either polyethylene oxide group or the polypropylene oxide is a hydrophilic group. It is assumed that they three-dimensionally protect the surface of colored microparticles prepared as described above. Accordingly, crosslinking and coagulation among particles are minimized whereby it is possible to prepare a stable dispersion. An excessively high hydrophobic group results in a decrease in the desired effects of the present invention presumably due to a decrease in effects to cover the particle surface.

Introduction of the aforesaid hydrophilic polyethylene oxide chain or polypropylene oxide chain into polymers is preferably carried out in such a manner that vinyl monomers having the group represented by aforesaid General Formula (1) are copolymerized with the aforesaid vinyl monomers. Specific examples of such vinyl monomers include, the Brenmer Series, manufactured by NOF Corp., represented by the Brenmer AME Series (such as Brenmer AME-400), the Brenmer PME Series (such as Brenmer PME-1000 or Brenmer PME-4000), Brenmer 50POEP, the Brenmer 55PET Series (such as Brenmer 55PET800), and the Brenmer PP Series (such as Brenmer PP800).

Further, it is preferable that the group represented by R in aforesaid General Formula (1), which is located at the terminal of these polyethylene oxide and polypropylene oxide groups, comprises no active hydrogen atoms. When the active hydrogen incorporated, crosslinking among particles may occur by crosslinking agents having a functional group.

By radically polymerizing polymerizable vinyl monomers having the polyethylene oxide group or the polypropylene oxide group represented by aforesaid General Formula (1), which are employed in the present invention, with other copolymerizable components, it is possible to prepare resins (being polymers) comprised of these constituting components. The amount of the monomer components having the polypropylene oxide group or the polypropylene oxide group in the polymer components is commonly 1-60 percent by weight, and is preferably 3-30 percent by weight. When the amount is less than the aforesaid limit, naturally coagulation is not prevented due to crosslinking reaction caused by crosslinking agents. On the other hand, when the amount is excessively large, all polymers become hydrophilic to result in a decrease in affinity with colorants whereby phase separation occurs. Therefore, an excessively large amount is not preferred because a minute particle dispersion is not stably formed or the size of coagulants increases.

Several composition examples of preferable resins (being polymers) in the present invention will be shown in examples.

Colorants sealed in seed particles together with the aforesaid polymers will now be described.

The aforesaid colorants can be employed without particular limitations as long as they are soluble or dispersible in the aforesaid polymers. For example, listed are fat dyes, disperse dyes, direct dyes, acid dyes, and basic dyes. In view of excellent sealing properties, it is preferable to use fat dyes as well as disperse dyes. Specific examples which are particularly preferable as the aforesaid disperse dyes are listed below, however, they are not limited thereto. Listed as particularly preferable specific examples are C.I. Disperse Yellow 5, 42, 54, 64, 79, 82, 83, 93, 99, 100, 119, 122, 124, 126, 160, 184:1, 186, 198, 199, 204, 224, and 237; C.I. Disperse Orange 13, 29, 31:1, 33, 49, 54, 55, 66, 73, 118, 119, and 163; C.I. Disperse Red 54, 60, 72, 73, 86, 88, 91, 92, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356, and 362; C.I. Disperse Violet 33; C.I. Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365, and 368; and C.I. Disperse Green 6:1 and 9. On the other hand, the aforesaid fat dyes are not limited to those below. Listed as particularly preferable specific examples are C.I. Solvent Black 3, 7, 27, 29 and 34; C.I. Solvent Yellow 14, 16, 19, 29, 56, and 82; C.I. Solvent Red 1, 3, 8, 18, 24, 27, 43, 51, 72, 73, 132, and 218; C.I. Solvent Violet 3; C.I. Solvent Blue 2, 11, and 70; C.I. Solvent Green 2 and 7; and C.I. Solvent Orange 2.

Further, it is possible use pigments which are insoluble in water and various organic solvents by dispersing them into polymer media.

Pigments usable in the present invention include conventional organic or inorganic pigments known in the art. Examples include azo pigments such as azo lakes, insoluble azo pigments, condensed azo pigments, or chelate azo pigments, polycyclic pigments such as phthalocyanine pigments, perylene and perylene pigments, anthraquinone pigments, quinacridone pigments, dioxazine pigments, thioindigo pigments, isoindoline pigments, or quinophthalone pigments, dye lakes such as basic dye type lakes, or acid dye type lakes, organic pigments such as nitro pigments, nitroso pigments, aniline black, or day light fluorescent pigments and inorganic pigments such as carbon black.

Specific organic pigments are exemplified below.

Listed as magenta or red pigments are C.I. Pigment Red 2, C.I. Pigment Red 3, C.I. Pigment Red 5, C.I. Pigment Red 6, C.I. Pigment Red 7, C.I. Pigment Red 15, C.I. Pigment Red 16, C.I. Pigment Red 48:1, C.I. Pigment Red 53:1, C.I. Pigment Red 57:1, C.I. Pigment Red 122, C.I. Pigment Red 123, C.I. Pigment Red 139, C.I. Pigment Red 144, C.I. Pigment Red 149, C.I. Pigment Red 166, C.I. Pigment Red 177, C.I. Pigment Red 178, and C.I. Pigment Red 222.

Listed as orange or yellow pigments are C.I. Pigment Orange 31, C.I. Pigment Orange 43, C.I. Pigment Yellow 12, C.I. Pigment Yellow 13, C.I. Pigment Yellow 14, C.I. Pigment Yellow115, C.I. Pigment Yellow 17, C.I. Pigment Yellow 93, C.I. Pigment Yellow 94, and C.I. Pigment Yellow 138.

Listed as cyan pigments are C.I. Pigment Blue 15, C.I. Pigment Blue 15:2, C.I. Pigment Blue 15:3, C.I. Pigment Blue 16, C.I. Pigment Blue 60, and C.I. Pigment Green 7.

The average particle diameter of the pigment dispersion employed in the ink of the present invention is preferably 10-200 nm, is more preferably 10-150 nm, and is still more preferably 10-100 nm. When the average particle diameter of the pigment dispersion exceeds 150 nm, images recorded on media result in degradation of the feeling of gloss and images recorded on transparent media result in marked degradation of the same. On the other hand, when the average particle diameter of the pigment dispersions is less then 10 nm, the stability of the pigment dispersion degrades, whereby the storage stability of the resulting ink also tends to degrade.

The particle diameter of the pigment dispersion can be determined employing commercially available particle size measurement apparatuses utilizing a light scattering method, an electrophoresis method, and a laser Doppler method. Further, it can also be determined as follows. Images of at least 100 particles are captured by a transmission type electron microscope, and the captured images are subjected to statistical processing, employing image analysis software such as Image-Pro (manufactured by Media Cybernetics).

Used as colorants may be metal complex dyes described in JP-A Nos. 9-277693, 10-20559, and 10-30061. For example, it is possible to use dyes represented by General Formulas (I) and (II), described in JP-A No. 10-20559.

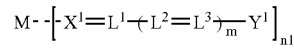

General Formula (I)

General Formula (II)

In General Formula (I), $X^1$ represents a group of atoms having a structure which is capable of forming at least a bidentate coordination bond with metal ions; $Y^1$ represents an aromatic hydrocarbon ring, a 5-membered or 6-membered heterocyclic ring, or $-L^4=Y^2$, wherein $Y^2$ represents a nitrogen containing 5-membered or 6-membered heterocyclic ring. $L^1$ and $L^4$ each represent a substituted or unsubstituted methine group. M represents a metal ion which forms a bidentate coordination bond with the group of atoms formed in $X^1$. m represents an integer of 0, 1, 2, or 3, and n1 represents an integer of 1, 2, or 3. Further, in General Formula (II), $X^3$, $Y^3$, and n2 are as defined for aforesaid $X^1$, $Y^1$, and n1.

Listed as specific examples of these dyes are the dyes shown below.

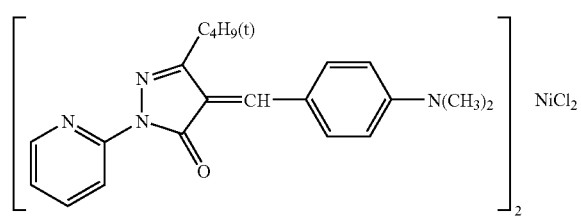

D-1

-continued
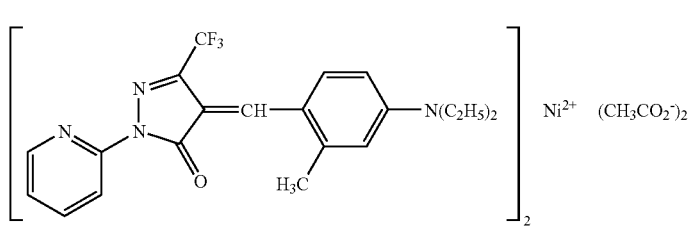
D-2
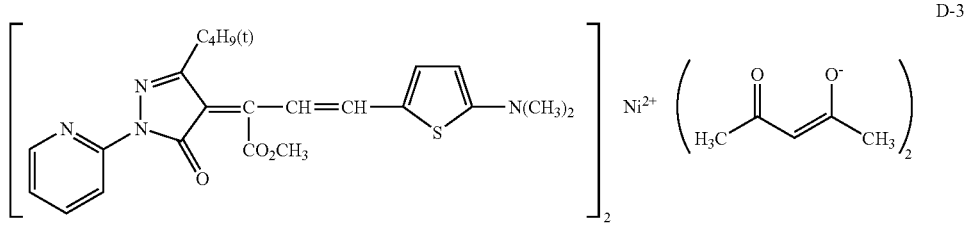
D-3
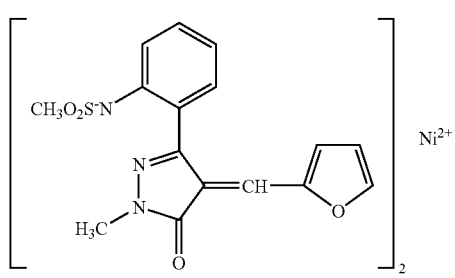
D-4
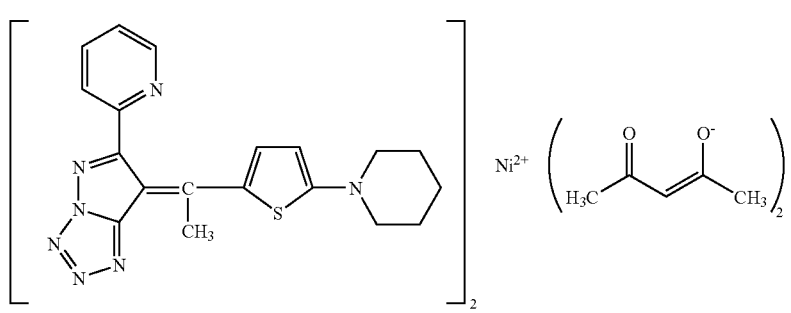
D-5
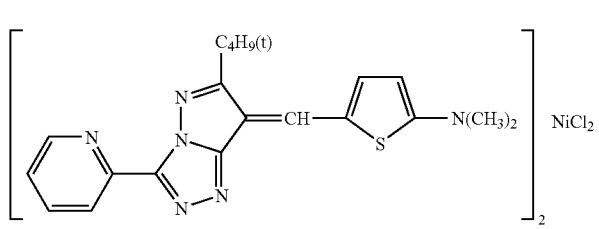
D-6
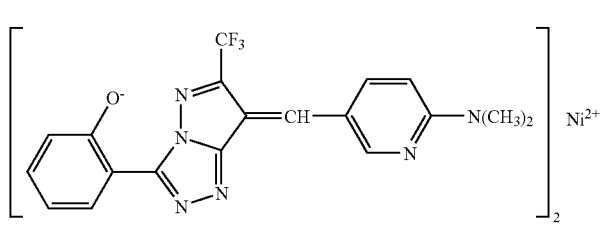
D-7

-continued
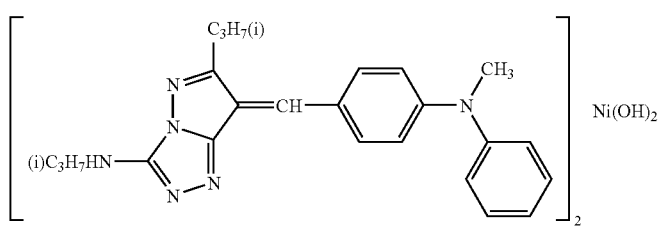
D-8
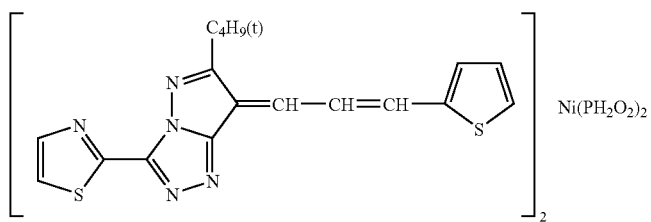
D-9
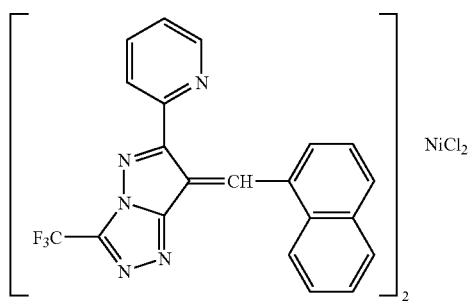
D-10
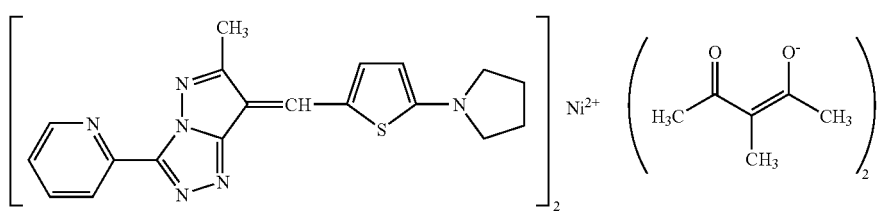
D-11
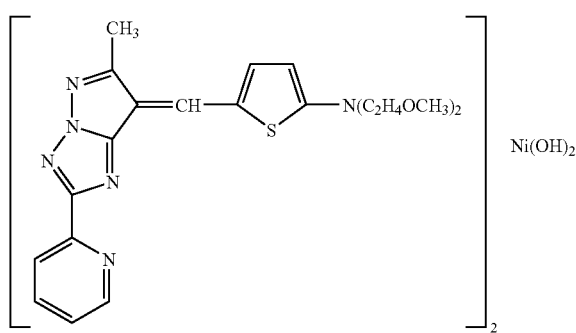
D-12
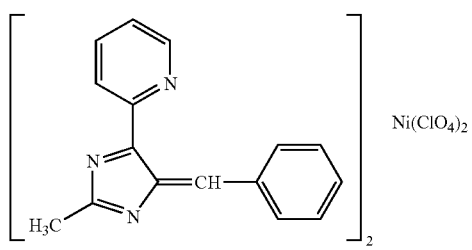
D-13

-continued
D-14
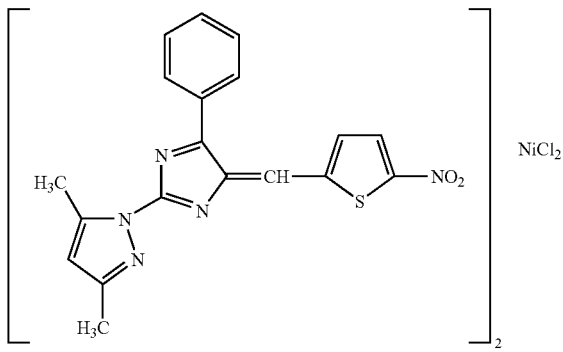
D-15
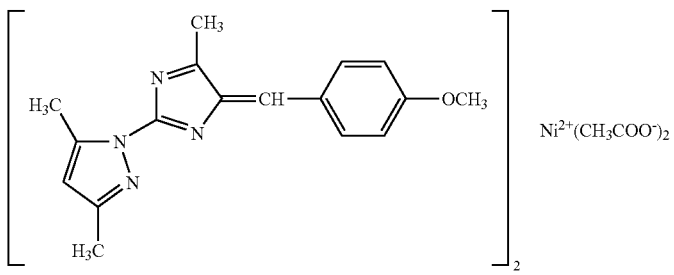
D-16
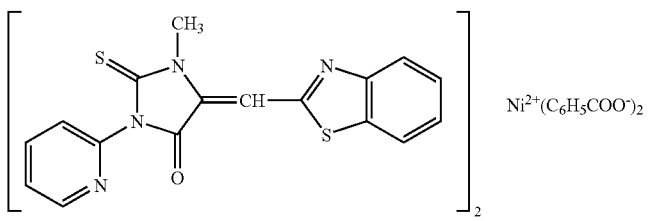
D-17
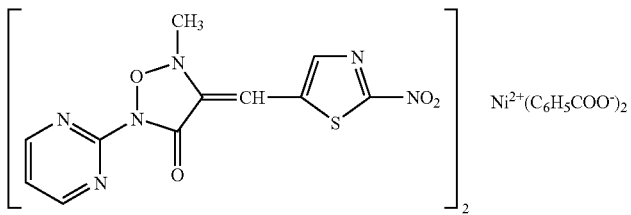
D-18
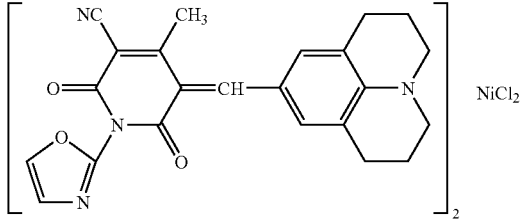
D-19
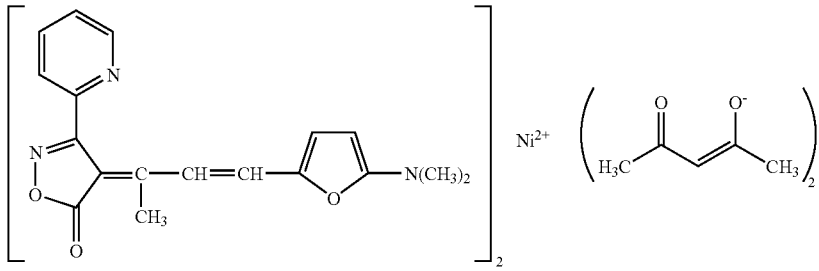

-continued
D-20
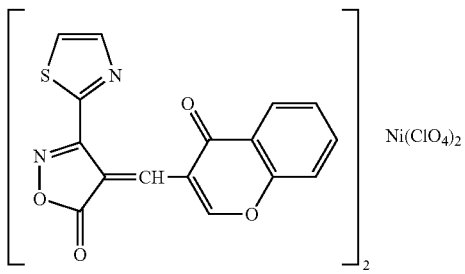
D-21
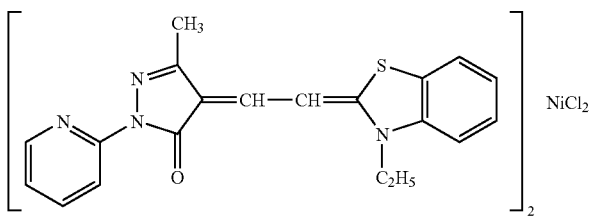
D-22
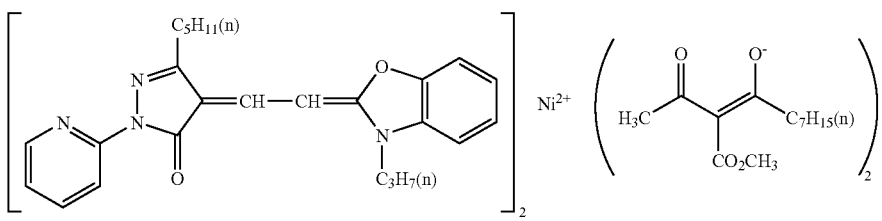
D-23
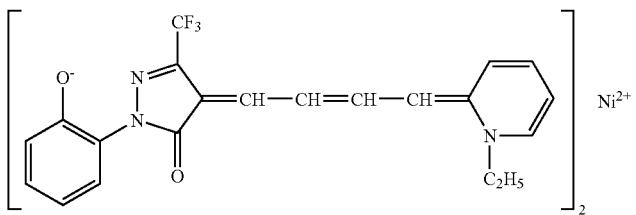
D-24
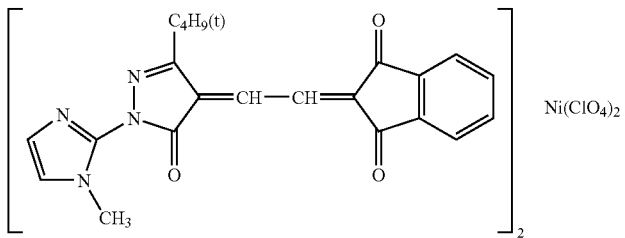
D-25
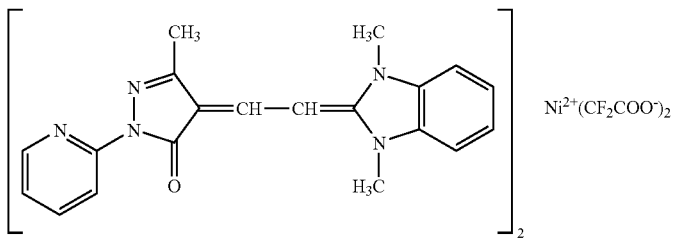

-continued
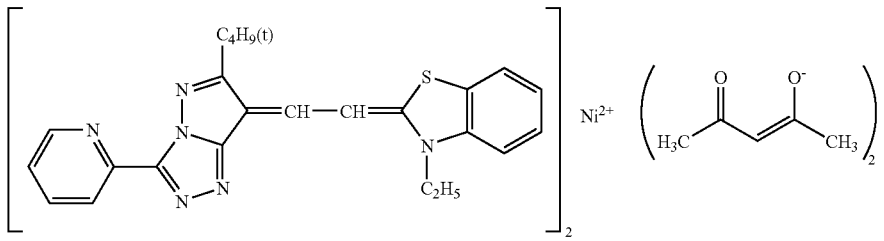 D-26
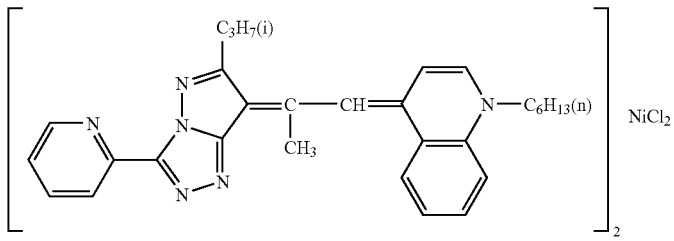 D-27
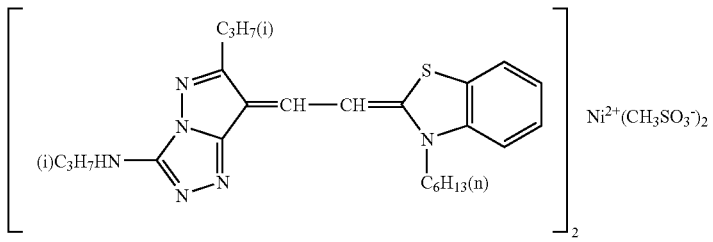 D-28
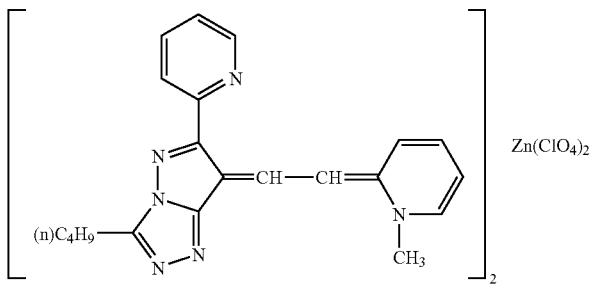 D-29
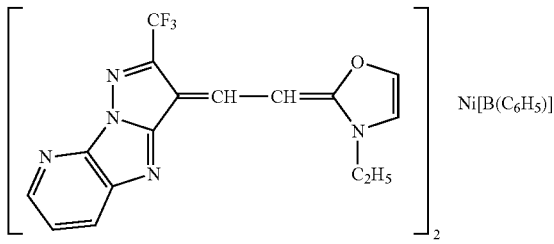 D-30
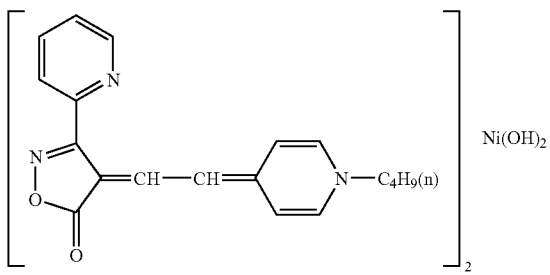 D-31

-continued
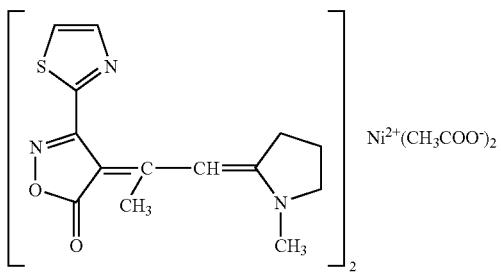
D-32
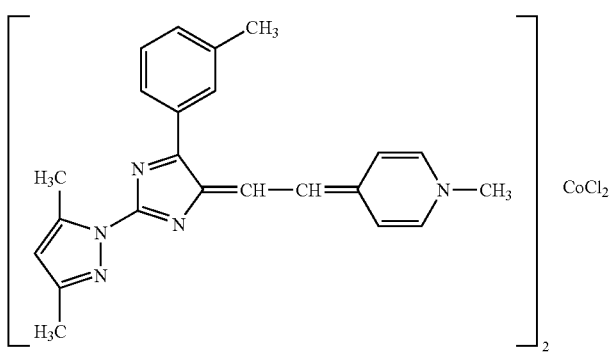
D-33
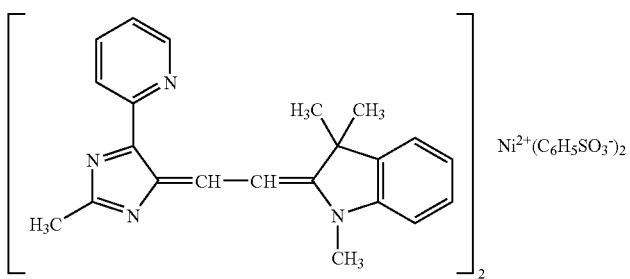
D-34
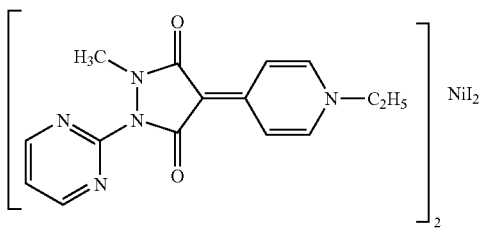
D-35
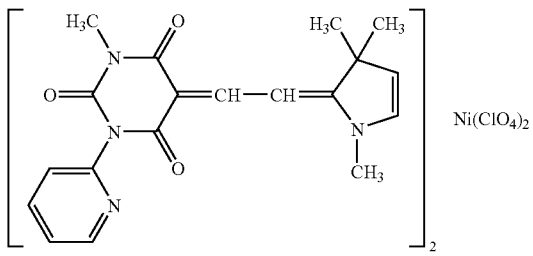
D-36

-continued
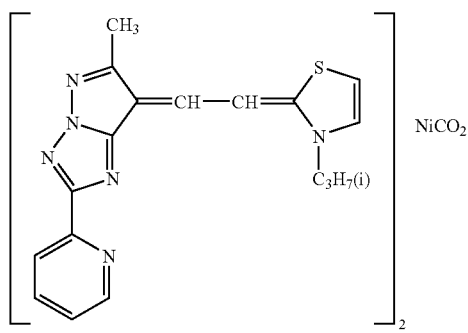 D-37
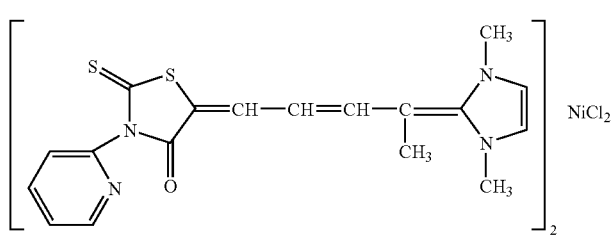 D-38
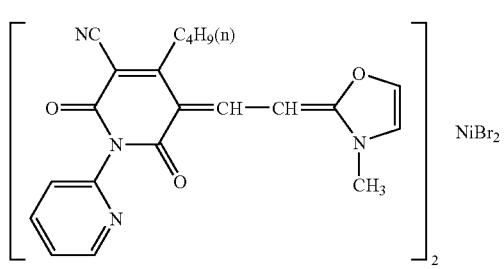 D-39
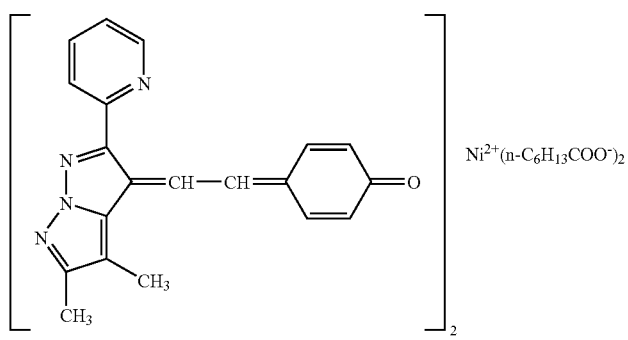 D-40
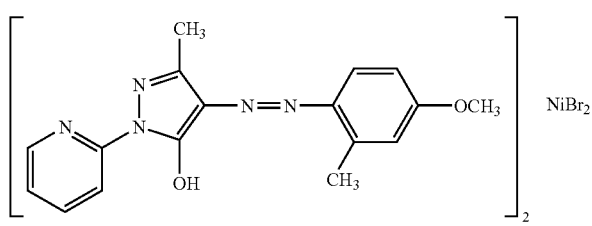 D-41
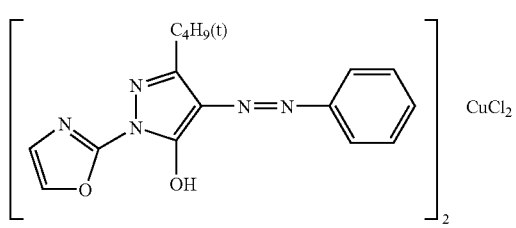 D-42

-continued
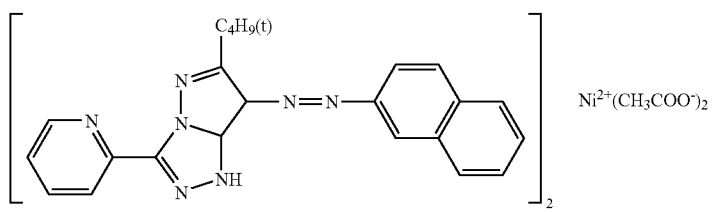
D-43
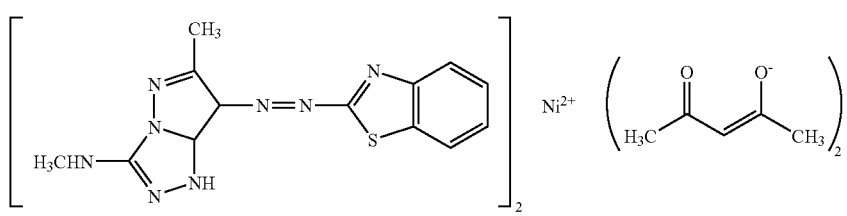
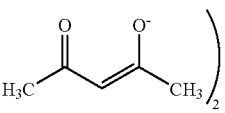
D-44
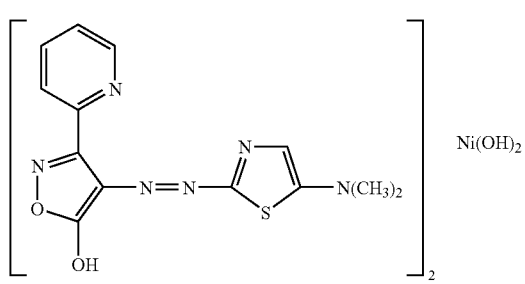
D-45
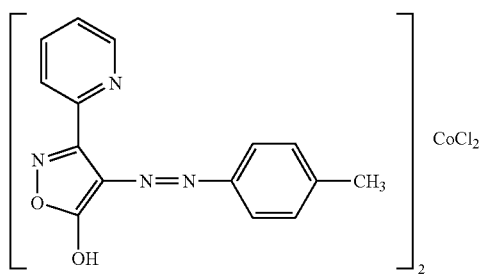
D-46
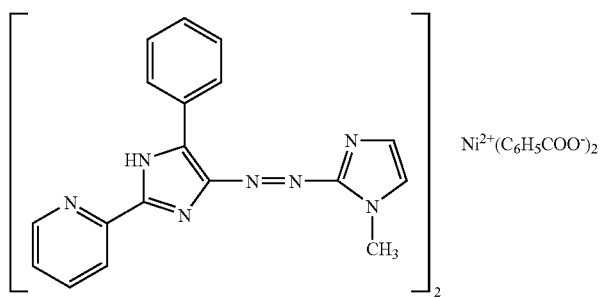
D-47
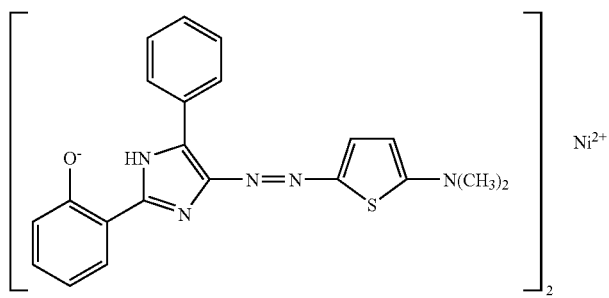
D-48

-continued
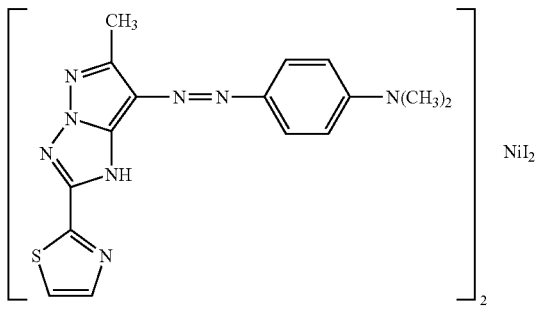 D-49
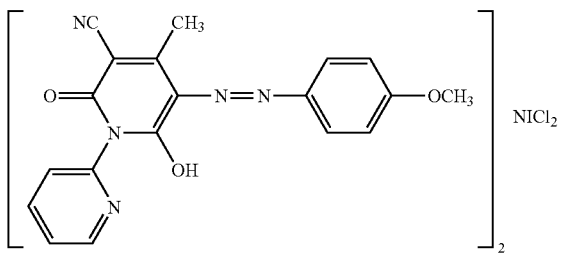 D-50
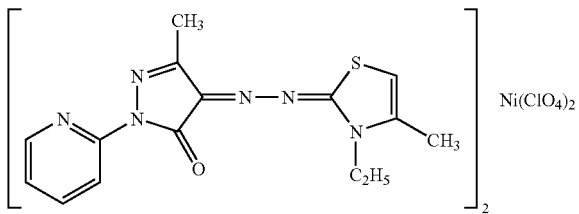 D-51
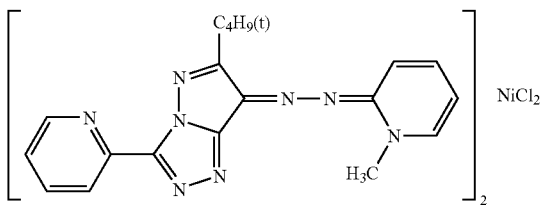 D-52
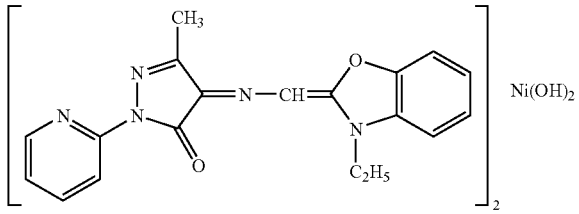 D-53
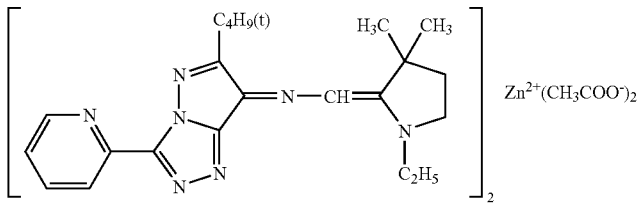 D-54

-continued
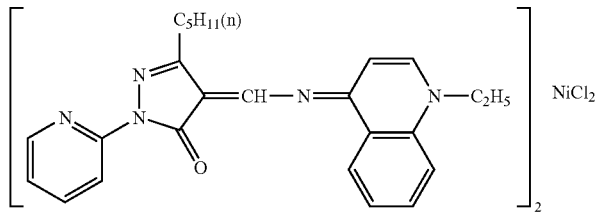 D-55
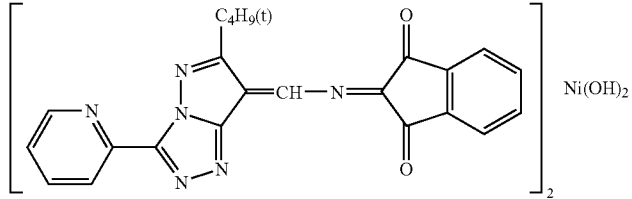 D-56
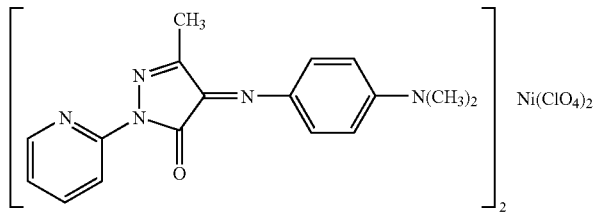 D-57
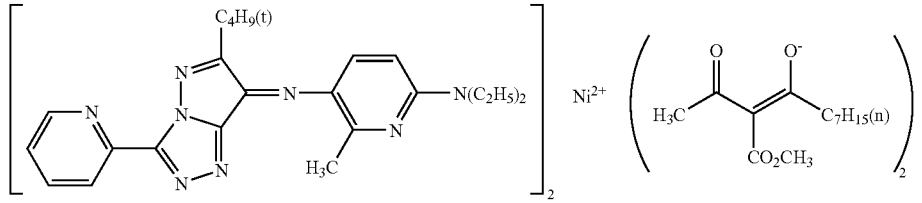 D-58
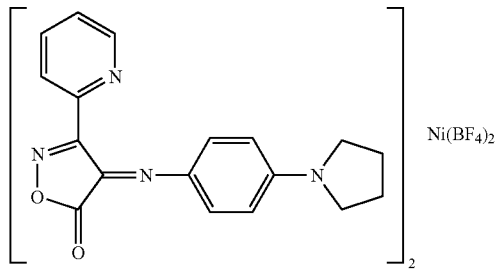 D-59
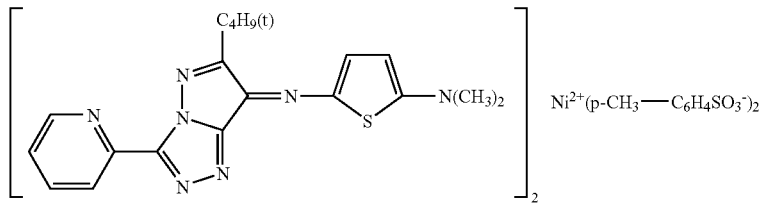 D-60
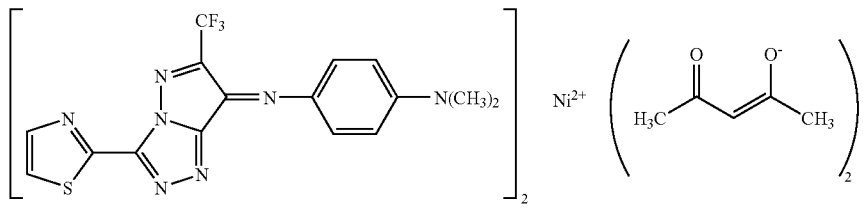 D-61

-continued
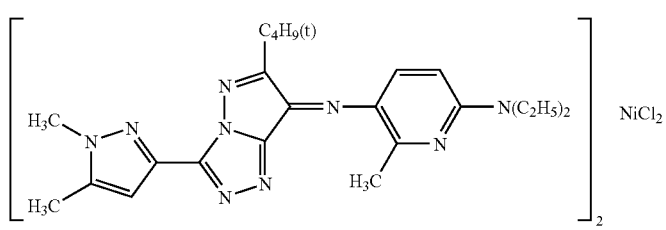 D-62
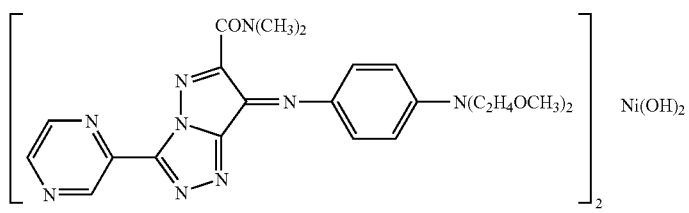 D-63
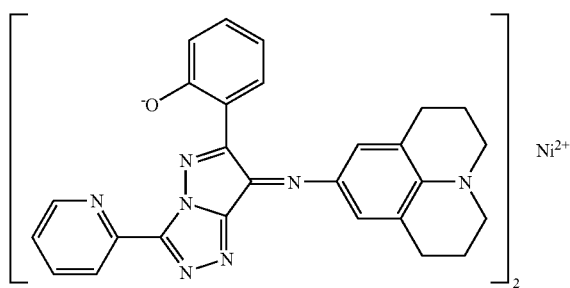 D-64
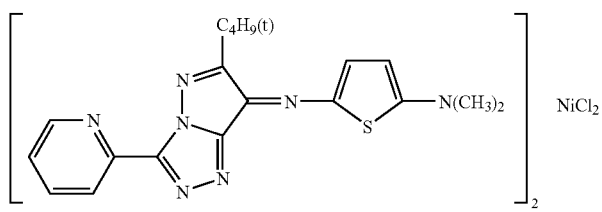 D-65
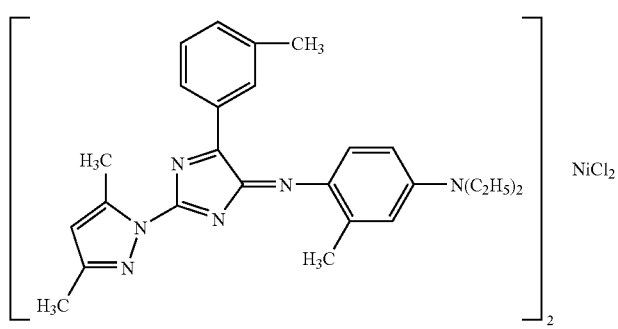 D-66
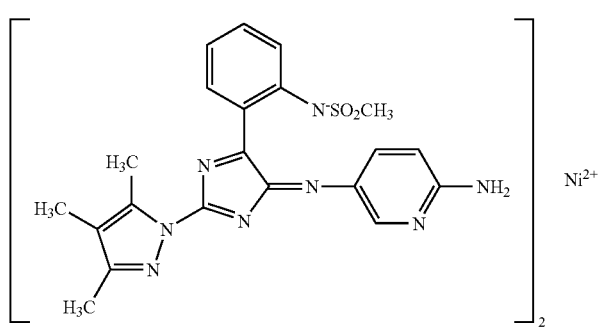 D-67

-continued

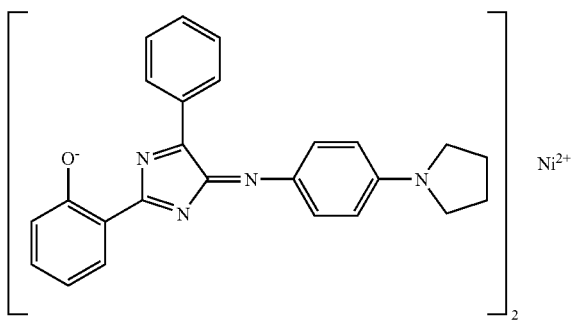
D-68

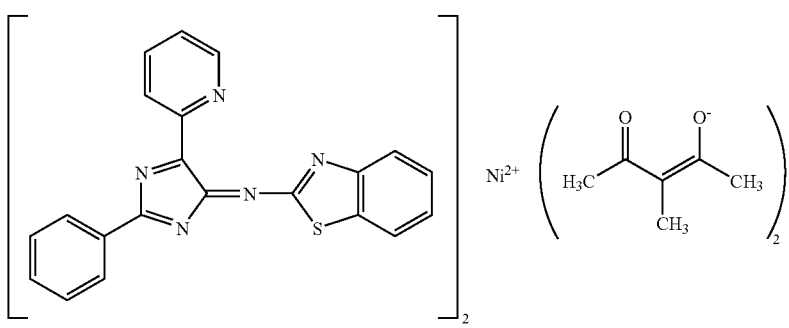
D-69

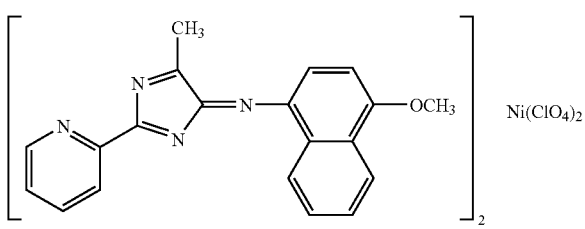
D-70

In the present invention, a colored microparticle dispersion prior to crosslinking is prepared as follows. These polymers and colorants are mixed with organic solvents, and the resulting mixture is emulsify-dispersed, if desired, under the presence of emulsifiers. Thereafter, solvents are removed through distillation. Listed as emulsifiers which can be employed during emulsification are, as common nonionic emulsifiers, polyoxyethylene alkyl ethers such as polyoxyethylene lauryl ether; polyoxyethylene alkyl phenyl ethers such as polyoxyethylene nonyl phenyl ether; and sorbitan higher fatty acid esters such as sorbitan monolaurate, and as anionic emulsifiers, higher fatty acid salts such as sodium oleate; alkylarylsulfonic acid salts such as sodium dodecylbenzenesulfonate; alkylsulfonic acid esters such as sodium lauryl sulfate; polyoxyethylene alkyl ether sulfuric acid ester salts such as polyoxyethylene lauryl ether sulfuric acid sodium salt; and alkyl sulfosuccinic acid ester salts such as sodium dioctylsulfocuccinate and derivatives thereof.

Further, instead of, or in addition to the aforesaid emulsifiers, it is preferable to use polymerizable emulsifiers (being reactive emulsifiers).

Reactive emulsifiers, either anion based or nonion based, are not particularly limited. For example, emulsifiers having a radically polymerizable unsaturated group such as a (meth)allyl group, a (meth)acryl group, or a styryl group may be employed individually or in combinations of at least two types.

Listed as such anionic reactive emulsifiers may be, for example, those represented by General Formulas (2)-(5) below.

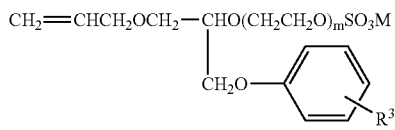
General Formula (2)

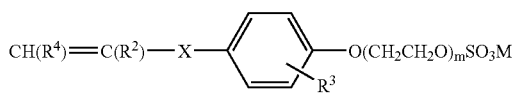
General Formula (3)

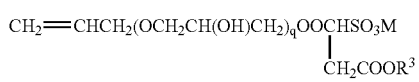
General Formula (4)

or

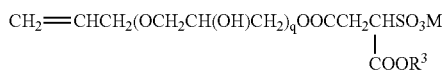

General Formula (5)

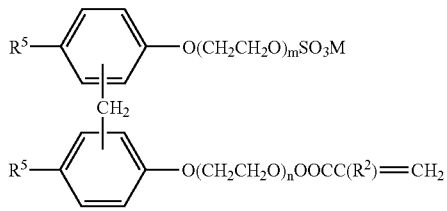

General Formula (6)

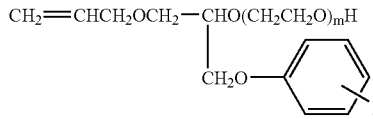

General Formula (7)

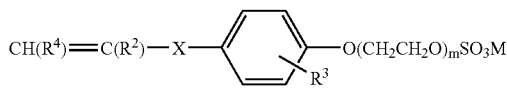

wherein $R^2$ represents a hydrogen atom or a methyl group; $R^3$ represents an alkyl group having 6-18 carbon atoms, an alkenyl group, an aryl group, or an aralkyl group; $R^4$ represents a hydrogen atom or a methyl group; $R^5$ represents an alkyl group having 6-18 carbon atoms, an alkenyl group, an aryl group, or aralkyl group; X represent a single bond or a methylene group, M represents an alkaline metal; m represents a natural number of 1-50; n represents a natural number of 1-50; and q represents 0 or 1.

Listed as specific examples of anion based reactive emulsifiers represented by aforesaid General Formula (2) may be, for example, "Adeka Reasoap SE-10N", "Adeka Reasoap SE-20N", and "Adeka Reasoap SE-30N" (all the above are manufactured by Asahi Denka Kogyo K.K.). Listed as specific examples of anion based reactive emulsifiers represented by aforesaid General Formula (3) may be, for example, "Aquaron HS-05", "Aquaron HS-10", "Aquaron HS-20", and "Aquaron HS-30" (all the above are manufactured by Dai-Ichi Kogyou Seiyaku Co., Ltd.). Further, listed as specific examples of anion based reactive emulsifiers represented by aforesaid General Formula (4) may be, for example, "Latemul S-120", "Latemul S-120A", "Latemul S-180", and "Latemul. S-180A" (all the above are manufactured Kao Corp.), and "Ereminol JS-21" (manufactured by Sanyo Chemical Industry Co., Ltd.). Listed as specific examples of anion based reactive emulsifiers represented by aforesaid General Formula (5) may be, for example, "Antocs MS-60" (manufactured by Nippon Nyukazai Co., Ltd.).

Other than these, listed as anion based reactive emulsifiers may be, for example, alkylalkenylsuccinic acid ester salt based reactive emulsifiers such as "Latemul ASK" (manufactured by Kao Corp); polyoxyalkylene(meth)acrylate sulfuric acid ester salt based reactive emulsifiers such as "Ereminol RS-30" (manufactured by Sanyo Chemical Industry Co., Ltd.); polyoxyalkylene alkyl ether aliphatic unsaturated dicarboxylic acid ester salt based reactive emulsifiers such as "RA-1120" and "RA-2614" (manufactured by Nippon Nyukazai Co., Ltd.); (meth)acrylic acid sulfoalkylester salt based reactive emulsifiers such as "Antocs MS-2N" (manufactured by Nippon Nyukazai Co., Ltd.); phthalic acid dihydroxalkyl(meth)acrylate sulfuric acid ester salt based reactive emulsifiers; mono or di(glycerol-1-alkylphenyl-3-allyl-2-polyoxyalkylene ether) phosphoric acid ester salt based reactive emulsifiers such as "H-3330PL" (manufactured by Dai-ichi Kogyo Seiyaku Co., Ltd.). Further, listed as nonion based reactive emulsifiers may be, for example, reactive emulsifiers represented by General Formulas (6) and (7) below.

wherein $R^2$ represents a hydrogen atom and a methyl group; $R^3$ represents an alkyl group having 6-18 carbon atoms; m represents a natural number of 1-5, an alkenyl group, an aryl group, or an aralkyl group; $R^4$ represents a hydrogen atom or a methyl group; X represents a single bond or a methylene group; and M represents an alkaline metal.

Listed as specific examples of the nonion based reactive emulsifiers represented by aforesaid General (6) may be "Adeka Reasoap NE-10", "Adeka Reasoap NE-20", and "Adeka Reasoap NE-30" (all the above are manufactured by Asahi Denka Kogyo K.K.). Listed as specific examples of the nonion based reactive emulsifiers represented by aforesaid General (7) may be "Aquaron RN-10", "Aquaron RN-20", "Aquaron RN-30", and "Aquaron RN-50" (all the above are manufactured by Dai-ichi Kogyo Seiyaku Co., Ltd.). Further, listed as others may be, for example, polyoxyalkylene alkylphenyl ether(meth)acrylate based reactive emulsifiers such as "RMA-564" and "RMA-568" (all the above are manufactured by Nippon Nyukazai Co., Ltd.) and polyoxyalkylene alkylphenyl ether(meth)acrylate based reactive emulsifiers such as "RMA-1114" (manufactured by Nippon Nyukazai Co., Ltd.).

The used amount of these reactive emulsifiers is customarily 0.1-30 parts by weight with respect to 100 parts by weight of the total polymers, is preferably 2-25 parts by weight, and is most preferably 3-20 parts by weight.

These emulsifiers form a stable electrical double layer adjacent to particles and in addition, are reactive with resins. Consequently, it is preferable that during or after emulsification, it is possible to introduce crosslinking along with the polyethylene oxide chain and the polypropylene oxide chain.

Colored microparticles comprised of these colorants and the aforesaid resins can be produced employing various emulsification methods. Various methods can be employed as an emulsification method. Examples of such methods are summarized, for example, on page 86 of "Kinosei Nyukazai-Nyukagijutsu no Shinpo to Oyotenkai (Progress and Application Development of Functional Emulsifiers and Emulsification Technology), CMC". In the present invention, it is particularly preferable to use homogenizers utilizing ultrasonic, high speed rotation shearing, and high pressure.

In emulsification dispersion employing ultrasonic, it is possible to use either of two systems, a batch system and a continuous system. The batch system is suitable for the preparation of a relatively small amount of samples, while the continuous system is suitable for the preparation of a larger amount of samples. In the continuous system, it is possible to use apparatuses such as UH-600SR (manufactured by SMT Corp.). In such a continuous system, ultrasonic duration can be determined by the volume of a dispersion chamber/flow rate×circulation frequency. When a plurality of ultrasonic apparatuses is employed, the duration is obtained as the total of each time. Practical ultrasonic duration is at most 10,000 seconds. When the required duration is at least 10,000 seconds, load for the process increases, whereby in practice, it is required to decrease the emulsification dispersion duration by re-selection of emulsifiers. As a result, duration such as 10,000 seconds or longer is not needed, and more preferable duration is 10-2,000 seconds.

Employed as emulsification dispersion apparatuses utilizing high speed rotation shearing may be disper mixers described on pages 255-256 of "Kinosei Nyukazai-Nyukagijutsu no Shinpo to Oyotenkai (Progress and Application Development of Functional Emulsifiers and Emulsification Technology), CMC", homomixers described on page 251 of the same, and ultra-mixers described on page 256 of the same. Any of these types may be selected and used depending on the viscosity of liquid compositions during emulsification dispersion. In these emulsification dispersion apparatuses utilizing high speed rotation shearing, the frequency of rotation of the stirring blades is critical. In the case of apparatuses having stators, clearance between the stirring blade and the stator is customarily about 0.5 mm, and it is not possible to make the clearance extremely narrow. As a result, shearing force depends mainly on the peripheral speed of the stirring blades. A peripheral speed range of 5-150 m/second is usable for emulsification dispersion in the present invention. When the peripheral speed is low, it frequently occurs that even though emulsification time is increased as desired, it is not possible to achieve a decrease in the diameter of particles as desired. On the other hand, in order to achieve a peripheral speed of 150 m/second, extreme enhancement of the performance of the motor is required. The aforesaid peripheral speed is more preferably 20-100 m/second.

LAB 2000 (manufactured by MST Co.) and the like can be used for such high pressure emulsification dispersion. Its emulsification dispersion capability varies depending on the pressure applied to the samples. The aforesaid pressure is preferably in the range of $10^4$-$5 \times 10^6$ kPa. Further, if desired, the targeted particle diameter can be achieved by carrying out emulsification dispersion several times. When the pressure is excessively low, a frequent result is that the targeted particle diameter is not achieved even though the frequency of emulsification and dispersion is increased. On the other hand, application of pressure at $5 \times 10^5$ kPa is not practical due to the excessive load applied to the apparatus. The applied pressure is more preferably in the range of $5 \times 10^4$-$2 \times 10^5$ kPa.

These emulsification dispersion apparatuses may be employed individually or, if desired, in combination. When colloid mills or flow jet mixers are employed individually, the objective of the present invention cannot be achieved. However, when combined with the apparatuses of the present invention, it is possible to enhance the effects of the present invention such that emulsification dispersion can be carried out in a shorter time.

In the present invention, after dissolving, in organic solvents such as ethyl acetate, the aforesaid oil-soluble dyes together with the aforesaid copolymerized polymers having a crosslinking group such as a polyethylene oxide group, a polypropylene oxide group, or an isocyanate group, the resulting mixture is emulsify-dispersed employing the aforesaid dispersion apparatuses. Subsequently, solvents are removed and a water-based dispersion is formed. Thereafter, as crosslinking agents, the aforesaid amine compounds such as diethylenetriamine or 3-aminopropanol are mixed with the water-based dispersion, which had previously been subjected to emulsification dispersion, to undergo crosslinking. In order to accelerate the reaction, it is preferable that, for example, if desired, a water-based dispersion is heated in the range of 40-90° C. to undergo reaction over a sufficient period of time (such as several minutes to several hours even though varied depending on the resulting crosslinking) so that crosslinking reaction in the interior of particles proceeds sufficiently.

Further, when the reaction proceeds relatively slowly, a method may be used in which the aforesaid crosslinking agents, mixed with polymers and dyes, are dissolved in solvents and subsequently emulsify-dispersed.

Water-based dispersion, as described herein, refers to dispersion in which the aforesaid colored microparticles are dispersed in a water-based medium comprised of water as a main component. For example, water-insoluble or water-soluble organic solvents may be mixed and media comprised of water as a main component refer to those in which the ratio of water in the medium is at least 50 percent. Herein, "water-based" of water-based ink means the same as above.

Further, preferably employed as organic solvents according to the present invention, which dissolve or disperse the aforesaid polymers and colorants, are those having a low boiling point (for example, at most 150° C. and preferably at most 100° C.). In practice, preferably employed are solvents such as ethyl acetate, butyl acetate, methyl ethyl ketone, butanol, and cyclohexane.

In the colored microparticle dispersion according to the present invention, colored microparticles comprised of colorants and resins (being polymers) formed as above are employed as seed particles which undergo polymerization in the presence of added polymerizable components and further are subjected to formation of a core/shell structure.

In the present invention, a preferable method in which polymerization is carried out on the seed particles in the presence of added polymerizable components is that after forming a colored microparticle dispersion comprising colorants and resins as described above, polymerizable monomers having a unsaturated double bond are added and emulsion polymerization is carried out in the presence of surface active agents so that polymerization and deposition on the surface of colored microparticles which function as the seed particles proceeds simultaneously. When formed employing the aforesaid method, in the preferable case, the post-added polymerizable monomers having an unsaturated double bond undergo polymerization on the aforesaid seed particles to form polymer shells.

Listed as monomers, having a polymerizable unsaturated double bond, which are post-added to seed particles comprised of colorants and resins and undergo polymerization on the particles, are ethylene, propylene, butadiene, vinyl chloride, vinylidene chloride, vinyl acetate, styrene, and compounds selected from (meth)acrylic acid esters, (meth)acrylic acids, and acrylamides. Of these, specifically preferred are styrene and (meth)acrylic acid esters such as ethyl(meth)acrylate, butyl(meth)acrylate, or ethyl hexyl (meth)acrylate. In order to achieve the stability of the particles, it is preferable that a mixture consisting of the aforesaid monomers, monomers having a polymerizable unsaturated double bond having a hydroxyl group in the molecule such as hydroxyalkyl(meth)acrylate, e.g. hydroxyethyl(meth)acrylate or monomers having a polymerizable unsaturated double bond having a hydroxy group in an amount of at most 50 percent of the total raw material monomers which are post-added, and other monomers having an ethylenic unsaturated double bond undergoes copolymerization.

Preferable examples of such copolymers include styrene/2-hydroxyethyl methacrylate and styrene/2-hydroxyethyl acrylate.

Further, in order to enhance the stability of shells, ethylenic unsaturated monomers having a pKa value of 3-7, such as monomers comprising carboxylic acids such as acrylic acid or methacrylic acid, or monomers comprising sulfonic acid may be employed in an amount of at most 10 percent of the copolymerization components. By employing these monomer components to form shells, the stability of the water based dispersion of the aforesaid minute core/shell colored particles is enhanced.

Further, after formation of the shells, crosslinking is carried out in the presence of monomers having a polymerizable unsaturated double bond having a functional group which reacts with the aforesaid crosslinking agents, while the proportion of the aforesaid monomers is at most 50 percent. For example, shells are formed employing the aforesaid vinyl monomers having an isocyanate group or an epoxy group, or vinyl monomers having a carboxyl group which react with an oxazoline group, and hydrazide crosslinking agents having an active hydrogen atom such as vinyl monomers having a group which undergo crosslinking with aforesaid adipic acid hydrazide (ADH, manufactured by Kyowa Hakko Kogyo Co., Ltd.). In such a manner, after formation of the shells, crosslinking is carried out employing crosslinking agents.

Further, when crosslinking is carried out in shells, shells may be formed employing multifunctional vinyl monomers such as ethylene glycol dimethacrylate, ethylene glycol diacrylate, or divinylbenzene as a copolymerization component together with monomers having a polymerizable unsaturated double bond such as aforesaid vinyl acetate, styrene, or (meth)acrylic acid esters. Simultaneously during formation of shells or after formation of shells, it is allowable to conduct three-dimensional crosslinking reaction within the shell.

In the present invention, the amount of polymers employed to form shells is 5-95 percent by weight with respect to the total polymers. When the amount is at most 5 percent by weight, some of the cores comprising a large amount of colorants tends to appear on the surface of particles due to insufficient thickness of the shells. On the other hand, when the amount of the polymers in the shells is excessively large, the colorant protecting function of cores tends to be degraded. The aforesaid amount is more preferably 10-90 percent by weight.

The total amount of colorants is preferably 20-1,000 percent by weight with respect to the total amount of polymers. When the amount of colorants is excessively small compared to polymers, image density after ejection does not increase, while when the amount of colorants is excessively large, the protection function of polymers is not sufficiently exhibited.

The volume conversion average particle diameter of the colored microparticle dispersion according to the present invention, which are prepared as above, is commonly 10-100 nm, and is preferably 20-80 nm. In the above range of particle diameter, the dispersion is stable. As a result, it results in bright color, and the resulting ink exhibits excellent storage stability.

The aforesaid crosslinking reaction is preferably conducted as follows. Introduction of crosslinking into dye containing cores is carried out so that phase separation from colorants does not occur. On the other hand, introduction of crosslinking into shells is carried out preferably onto the outermost surface so that, as described below, crosslinking among particles does not occur by the introduction of crosslinking.

Further, regarding shells, it is preferable to minimize crosslinking among particles in such a manner that shells are formed employing monomer components having a crosslinking group such as multifunctional vinyl monomers or monomer components having a group which reacts with a crosslinking agent to form a crosslinking bond together with monomer components having a group, such as aforesaid polyethylene oxide or polypropylene oxide, which results in steric hindrance.

It is critical to detect the practical formation of the core/shell structure in the colored microparticle dispersion according to the present invention prepared as above. In the present invention, the diameter of each particle is very small, being at most 100 nm. As a result, in view of resolution, analytical means are limited. Employed as analytical means which meet the above requirements are TEM and TOF-SIMS. It is possible to observe minute particles which have resulted in a core/shell structure in such a manner that a liquid dispersion is applied onto a carbon substrate and subsequently dried. When images are observed employing TEM, differences in types of organic materials such as polymers result in small difference in contrast. Consequently, in order to confirm whether core/shell structures have formed, it is necessary to dye minute particles with osmium tetraoxide, ruthenium tetraoxide, chlorosulfonic acid/uranyl acetate, or silver sulfide. Minute particles comprised only of cores are dyed and observed employing TEM. Thereafter, shells are formed and comparison is conducted. In addition, minute particles provided with shells and minute particles provided without shells are blended and subsequently dyed. Then confirmation is carried out in such a manner that the ratio of minute particles which differ in degree of dying corresponds to that of with and without shells.

When mass spectrometers such as TOF-SIMS are used, it is confirmed that the amount of colorants adjacent to the surface on which shells can be formed decreases compared to the case in which only a core is present. When colorants have elements which are not incorporated into the polymer of shells, it is possible to confirm the formation of shells which have a less amount of the colorants while using any of the aforesaid elements as a probe.

Namely, it is possible to determine the colorant amount (concentration) as follows. By employing TOF-SIMS, initially, the total amount of ions having a mass number of 1-1,000 on the surface of each minute particle is determined. Subsequently, employing these, the colorant amount can be determined based on the ratio of the total amount of ions derived from the element which is not incorporated into polymers to that of the element which is incorporated into dyes. By employing this method, when the colorant-containing ratio of each of the shells and the cores which is not subjected to core/shell formation is compared, it is possible to determine each dye-containing ratio (concentration). TOF-SIMS makes it possible to analyze elements in the region from the surface to several nanometers below the surface. As a result, it is possible to analyze the minute core/shell particles according to the present invention.

When such elements are not present, a suitable colorant is employed. Then it is possible to compare the amount of the colorant in shells to that without shells.

Further, core/shell particles are buried into epoxy resins. Subsequently, ultra-thin slices are prepared, employing a microtome, and dyed, whereby it is possible to clearly observe the formation of core/shell. As noted above, when polymers and colorants have an element which is used as a probe, TOF-SIMS and TEM make it possible to estimate core/shell compositions as well as distribution amounts of colorants to cores and shells.

In the present invention, the colorant proportion (concentration) in the shell is at most 0.8 of that in the core, which is not subjected to formation of core/shell, is preferably at most 0.5, and is more preferably at most 0.2 (of course, it may be 0, or an infinitely small value approaching zero). By such action, polymer cores include the main portion of colorants, whereby the resulting fastness is enhanced and the color tone is maintained. On the other hand, the polymer shells function as the suspension of the aforesaid minute particles incorporating colorants to contribute to the enhancement of stability as well as to contribute to acceleration of fixing of colorants, minimization of coagulation on media, enhancement of image quality, and durability of colorants and retention of color tone.

In order to achieve the desired particle diameter, it is critical to optimize formulas and select suitable emulsification methods. Formulas vary depending on employed colorants and polymers. However, it is required that hydrophilicity of shell-forming polymers is commonly higher than that of core-forming polymers. Further, it is also required that the amount of colorants incorporated into shell-forming polymers is less than that incorporated into core-forming polymers. In addition, it is required that the hydrophilicity of colorants is lower than that of shell-forming polymers. It is possible to estimate hydrophilicity and hydrophobicity utilizing, for example, solubility parameters (SP). The values, measurement, and calculation methods for the solubility parameter may be referred to the description from page 675 of Polymer Handbook, Fourth Edition (John Wiley & Sons, Inc.).

In view of film forming properties after printing, the durability, and suspension forming properties, the number average molecular weight of polymers employed in the core/shell is preferably 500-100,000, but is more preferably 1,000-30,000.

Further, preferred is a suspension which has a variation coefficient of the volume average particle diameter of at most 80 percent, which minimizes particle diameter variation during storage, and the variation coefficient is more preferably at most 50 percent.

The volume average particle diameter was obtained in such a manner that a circle conversion average particle diameter which was obtained utilizing the average value of the projection areas (which were determined for at least 100 particles) in photographs captured by a transmission type electron microscope (TEM) was subjected to sphere conversion. Further, the volume average particle diameter and its standard deviation were obtained, and the variation coefficient was obtained by dividing the resulting standard deviation by the volume average particle diameter. Alternatively, it is possible to obtain the variation coefficient utilizing a dynamic light scattering method. It is possible to obtain the aforesaid variation coefficient employing, for example, a laser size diameter analytical system, manufactured by Otsuka Electronics Co., Ltd. or a Zeta Sizer, manufactured by Malvern Corp.

The variation coefficient of the particle diameter is a value obtained by dividing the standard deviation of the particle diameter by the particle diameter. An increase in this value means that the particle size distribution widens. When the variation coefficient of the volume average particle diameter is at least 80 percent, the resulting size distribution widens markedly to result in fluctuation in physical surface properties among particles, whereby particles tend to coagulate. Further, coagulation of particles tends to result in light scattering of colorants on media and the resulting image quality tends to be degraded.

In the colored microparticle dispersion according to the present invention, prepared as above, polymers are blended in the polymer emulsion type water-based ink of the present invention preferably in an amount of 0.5-50 percent by weight and more preferably in an amount of 0.5-30 percent by weight. When the aforesaid polymer blended amount is less than 0.5 percent by weight, colorants are not sufficiently protected. On the other hand, when it exceeds 50 percent by weight, in some cases, the storage stability of inks in the form of suspension decreases and clogging at the printer head occurs due to an increase in viscosity of the ink caused by its evaporation at the tip of the nozzles and coagulation of the suspension. Consequently, it is preferable to control the aforesaid blended polymer amount within the aforesaid range.

On the other hand, the aforesaid colorants are blended in the aforesaid ink preferably in an amount of 1-30 percent by weight and more preferably in an amount of 1.5-25 percent by weight. When the aforesaid colorant blended amount is less than one percent by weight, printing density becomes insufficient, while when it exceeds 30 percent by weight, the storage stability of the emulsion is degraded tending an increase in the particle diameter due to coagulation. Consequently, it is preferable to control the aforesaid blended colorant amount within the aforesaid range.

The water-based ink of the present invention is comprised of water as the major water-based medium and a polymer emulsion into which the aforesaid colorants are sealed. Incorporated into the aforesaid emulsion may be various additives, known in the art, which include, for example, humectants such as polyhydric alcohols, dispersing agents, defoamers such as silicone based, mildewcides such as chloromethylphenol based, and/or chelating agents such as EDTA, and oxygen absorbing agents such as sulfite salts.

The colored microparticle dispersion according to the present invention is subjected to crosslinking in the interior of particles, resulting in high solvent resistance. As a result of these additives stability is high in the presence of various organic solvents, especially humectants (which exhibit effects to lower surface tension) such as those shown below, and coagulation barely occurs.

Listed as humectants are, for example, ethylene glycol, propylene glycol, diethylene glycol, triethylene glycol, tetraethylene glycol, polyethylene glycol, glycerin, diethylene glycol diethyl ether, diethylene glycol monon-butyl ether, ethylene glycol monomethyl ether, ethylene glycol monomethyl ether, ethylene glycol monobutyl ether, methylcarbitol, ethylcarbitol, butylcarbitol, ethylcarbitol acetate, diethylcarbitol, triethylene glycol monomethyl ether, triethylene glycol monomethyl ether, triethylene glycol monobutyl ether, and propylene glycol monomethyl ether, as well as polyhydric alcohols such as 1,2-hexabesiol, and ethers thereof, acetates, nitrogen containing compounds such as N-methyl-2-pyrrolidone, 1,3-dimethylimidazolidinone, triethanolamine, formamide, or dimethylformamide, and water-soluble organic solvents such as dimethylsulfoxide. They may be employed individually or in combinations of at least two types as humectants. The blending amount of these humectants is not particularly limited, and it is possible to blend these humectants in the aforesaid ink preferably in an amount 0.5-50 percent by weight and more preferably in an amount of 0.1-30 percent by weight.

Further, the aforesaid dispersing agents are not particularly limited. However, in view of exhibition of effects as a dispersing agent and minimization of the increase in the particle diameter in the suspension, their HLB values are preferably 8-18.

Dispersing agents are commercially available. Listed as such commercially available products are, for example, dispersing agents, Demol SNB, MS, N, MS, SSL, ST, and P (trade names), manufactured by Kao Corp.

The blended amount of dispersing agents is also not particularly limited. However, the blended amount in inks is 0.01-10 percent by weight. When the blended amount of the aforesaid compounds is less than 0.01 percent by weight, it is difficult to decrease the diameter of particles in the suspension to the desired small level. On the other hand, when it exceeds 10 percent by weight, the diameter of particles in the suspension increases or the stability of the emulsion decreases tending to result in undesired gelling. Consequently, it is preferable that the blended amount is controlled to remain within the aforesaid range.

Further, the aforesaid defoamers are not particularly limited, and it is possible to use commercially available products. Listed as such commercially available products are, for example, KF96, 66, and 69, as well as KS68, 604, 607A, 602, 603, KM73, 73A, 73E, 72, 72A, 72C, 72F, 82F, 70, 71, 75, 80, 83A, 85, 89, 90, 68-1F, and 68-2F (all are trade codes), manufactured by Shin-Etsu Silicone Co., Ltd. The blended amount of these compounds is not particularly limited and the blended amount in the polymer emulsion type water-based ink of the present invention is preferably 0.001-2 percent by weight. When the blended amount of the aforesaid compounds is less than 0.001 percent by weight, bubbles tend to form during preparation of the ink and it becomes difficult to remove minute bubbles in the ink. On the other hand, when it exceeds 2 percent by weight, formation of bubbles is minimized. Occasionally, however, during printing, printing quality is degraded due to formation of repellency within the ink. Consequently, it is preferable that the blended amount is controlled t remain within the aforesaid range.

Ink-jet heads which employ the ink-jet recording water-based ink of the present invention may use either an on-demand system or a continuous system. Employed as ejection systems may be any of the electrical-mechanical conversion systems (such as a single cavity type, a double cavity type, a bender type, a piston type, a share mode type, or a shared wall type), and electrical-thermal conversion systems (such as a thermal ink-jet type, or Bubble Jet (being a registered trade name)).

By employing the ink-jet recording water-based ink of the present invention, images are formed as follows. For example, ink droplets are ejected from ink-jet heads based on digital signals, employing a printer loaded with the ink-jet recording water-based ink and deposited onto an ink receptive material. Thus, ink-jet prints are prepared by forming ink-jet recording images on, for example, ink-jet image recording media.

Ink-jet image recording media may be, for example, plain paper, coated paper, cast coated paper, glossy paper, glossy film, and OHP film. Of these, preferred are, for example, so-called void layer having media to be recorded in which a porous layer is formed. Components or shapes of the aforesaid supports are not particularly limited. For example, except for supports which are shaped to a sheet, those having a three-dimensional structure may be available.

It is possible to not only use the water-based ink of the present invention as the ink-jet recording ink but also to use, for example, as inks for common fountain pens, ballpoint pens, and fiber-tipped pens. It is also possible to prepare minute particle powders by drying the suspension of the present invention. The resulting powders can then be used as toners for electrophotography.

EXAMPLES

The present invention will now be detailed with reference to examples, but the present invention is not limited thereto.

Resin Synthesis 1

Charged into a 3-liter 4-necked flask fitted with a dripping unit, a thermometer, a nitrogen gas inletting pipe, a stirrer, and a reflux cooling pipe was 20 g of dehydrated methyl ethyl ketone, which was then heated to 80° C. Under the composition ratio shown in Table 1, each monomer was collected so that the total weight reached 100 g, and further, 2 g of N,N'-azobisisovarelonitrile was added to the aforesaid monomer. The resulting mixed solution was dripped into the flask over two hours and the resulting mixture underwent reaction for 5 hours at the same temperature. Thereafter, 80 g of methyl ethyl ketone was added and the resulting mixture was cooled, whereby 50 percent by weight polymer solution was prepared.

TABLE 1

| Monomer Polymer | R1 | R2 | R3 | R4 | R5 |
|---|---|---|---|---|---|
| Brenmer PME-1000 | 30 | | 30 | | |
| Brenmer PME-4000 | | 30 | | 30 | |
| MMA | | | 10 | | 10 |
| HEMA | 20 | 10 | | 20 | 20 |
| ST | 40 | 40 | 40 | 20 | 40 |
| SMA | 10 | 10 | 10 | 20 | 20 |
| MAA | | | | 10 | |
| Karenz MOI | | | 10 | | |
| Brenmer G | | 10 | | | 10 |

Brenmer PME-1000: methacrylate having - $(EO)_m$—$CH_3$ (m ≈ 23)
Brenmer PME-4000: methacrylate having - $(EO)_m$—$CH_3$ (m ≈ 90)
Brenmer G: glycidyl methacrylate
All components above are manufactured by NOF Corp. Herein, EO represents —$CH_2CH_2O$—.
HEMA: 2-hydroxyethyl methacrylate
ST: styrene
MMA: methyl methacrylate
SMA: stearyl methacrylate
Karenz MOI: 2-methacryloyloxyethyl isocyanate (manufactured by Showa Denko K.K.)

Production of Colored Microparticles

Example 1

Production of Colored Microparticles in Which Cores are Crosslinked with Isocyanate and Shells are Crosslinked with Acryl Added to 24 g of a liquid containing 12 g of Resin R1, in Table 1, were 2 g of isophorone diisocyanate and 0.1 g of dibutyltyne dilaurate, and the resulting mixture underwent reaction at 40° C. for 60 minutes (Resin (2)). Charged into a pot of Clearmix CML-0.8S (manufactured by M Technique Co., Ltd.) was 12 g of C.I. Solvent Yellow 162 (being Dye (1)) together with 20 g of ethyl acetate, and the dye was allowed to complete dissolve while stirring. Further, after adding 270 g of a 2 weight percent KH-05 (manufactured by Dai-ichi Kogyo Co.)(being Emulsifier (3)) aqueous solution, the resulting mixture was emulsified at 12,000 rpm for 5 minutes while maintaining a temperature at 40° C. After removing some of the ethyl acetate under vacuum at 40° C., diethylenetriamine was added and the resulting mixture underwent crosslinking reaction at 60° C. for 120 minutes. Thereafter, the residual ethyl acetate and MEK were removed at 40° C. by decreasing pressure to 40 mHg.

Added to the resulting dispersion, heated to 65° C., was 3 g of an aqueous solution containing 3 g of MMA, 0.15 g of ethylene glycol dimethacrylate as a crosslinking agent, and 0.1 g of potassium persulfate over one hour, and the resulting mixture underwent reaction for 5 hours, whereby Colored microparticle Dispersion 1 having a core/shell structure was prepared.

Comparative Example 1

Comparative Colored microparticle Dispersion 1 was prepared in the same manner as Example 1, except that during shell formation, ethylene glycol dimethacrylate was omitted.

Example 2

Production of Colored Microparticles in Which Cores are Crosslinked with Epoxy, and Shells are Subjected to Acryl Crosslinked Polymer In the production method of colored microparticles in Example 1, emulsification was carried out in such a manner that instead of using Resin R1, Resin R2 was used as (Resin (2)), and further 270 g of a one weight percent sodium dodecylbenznenesulfonate aqueous solution was used. Further, 2 g of Epomate QX2 (manufactured by Japan Epoxy Resin) as a crosslinking agent was previously added to an emulsification oil phase, and after emulsification, crosslinking reaction was conducted at 80° C. for 120 minutes. Further, Colored microparticle Dispersion 2 was prepared in the same manner as Example 1 by providing crosslinked shells.

Comparative Example 2

Comparative Colored microparticle Dispersion 2 was prepared in the same manner as Example 2, except that the core crosslinking agent, Epomate QX2 was omitted.

Example 3

Production of Colored Microparticles in Which Cores are Crosslinked with Epoxy and the Outermost Layer Shell is Subjected to Acryl Crosslinked Polymers Charged into a pot of Clearmix CLM-0.8S (manufactured by M Technique Co., Ltd.) was 24 g (Resin (2)) of a liquid containing 12 g of Resin R3, in Table 1, together with 12 g of Cyan Dye FSB1504 (being Dye (1)) and 120 g of ethyl acetate and the aforesaid dye was allowed to complete dissolve while stirring. Further, after adding 260 g of a 3 weight percent KH-05 (manufactured by Dai-ichi Kogyo Co.)(being Emulsifier (3)) aqueous solution and 10 g of 2-hexanediol, the resulting mixture was emulsified at 12,000 rpm for 5 minutes while maintaining a temperature of 40° C. After removing some of the ethyl acetate under vacuum at 40° C., 3-aminopropanol was added and the resulting mixture underwent crosslinking reaction at 80° C. for 120 minutes. Thereafter, the residual ethyl acetate and MEK were removed at 40° C. by decreasing pressure to 40 mHg.

Added to the resulting dispersion heated to 65° C. was a solution containing a mixture of 2 g of methyl acrylate and 0.1 g of 2,2'-azobis(2,4-dimethylvaleronitrile) as an initiator over one hour, and the resulting mixture underwent reaction for 5 hours, whereby shells were formed. Further, a solution containing a mixture of 1 g of MMA, 2 g of Brenmer PP800 (manufactured by NOF Corp.), 0.15 g of ethylene glycol dimethacrylate, and 0.1 g of 2,2'-azobis(2,4-dimethylvaleronitrile) as an initiator was added over one hour, and the resulting mixture underwent reaction for 5 hours to form the outermost layer, whereby Colored microparticle Dispersion 3 was prepared.

Brenmer PP800: $CH_2=CH(CH_3)COO-(C_3H_6)_n-H$ ($n \approx 13$)

Comparative Example 3

Colored microparticle Dispersion 3 was prepared in the same manner as Example 3, except that the core crosslinking agent, diethylenetriamine, was omitted.

Example 4

Production of Colored Microparticles in Which Cores are Crosslinked with Epoxy and Shells are Crosslinked with Carbodiimide Charged into a pot of Clearmix CLM-0.8S (manufactured by M Technique Co., Ltd.) were 12 g of a liquid containing 6 g of Resin R5, in Table 1, and 12 g (being Resin (2)) of a liquid containing 6 g of Resin R4, also in Table 1, together with 12 g of Magenta Dye JD-263 (manufactured by Mitsui Chemicals, Inc.) (being Dye (1)), acid anhydride Epiclon B-440 (manufactured by Dainippon Ink and Chemicals, Inc.), and 120 g of ethyl acetate, and the aforesaid dye was allowed to complete dissolve while stirring. Further, after adding 270 g of a 2 weight percent KH-05 (manufactured by Dai-ichi Kogyo Co.)(being Emulsifier (3)) aqueous solution, the resulting mixture was emulsified at 12,000 rpm for 5 minutes while maintaining a temperature of 40° C. After removing some of the ethyl acetate under vacuum at 40° C., the resulting mixture underwent epoxy reaction at 80° C. for one hour. Then, 1 g of Carbodilite V-04 (manufactured by Nisshinbo Industries, Inc.) was added and the resulting mixture underwent reaction with carbodiimide at 98° C. for an additional 6 hours, whereby Colored microparticle Dispersion 4 was prepared.

Comparative Example 4

Preparation for Comparative Example 4 was carried out in the same manner as Example 4, except that Carbodilite was omitted.

Gradually added to 4 g of each of the above colored microparticle dispersions was one g of a 10 weight percent 1,2-pentanediol aqueous solution. After stirring well, the resulting mixture was allowed to stand for three days, and the variation ratio (in percent) of the particle diameter was determined.

A volume average particle diameter (in nm) was determined employing a laser particle size analyzing system, manufactured by Otsuka Electronics Co., Ltd.

Further, the circle conversion average particle diameter obtained from the average value of the projection area of TEM photographs was subjected to sphere conversion. Subsequently a volume average particle diameter and its standard deviation were obtained. Then, the variation coefficient was obtained by dividing the resulting standard deviation by the resulting volume average particle diameter.

TABLE 2

|  | Example 1 | Comparative Example 1 | Example 2 | Comparative Example 2 | Example 3 | Comparative Example 3 | Example 4 | Comparative Example 4 |
|---|---|---|---|---|---|---|---|---|
| Original Particle Diameter (nm) | 60 | 60 | 80 | 80 | 60 | 50 | 60 | 70 |
| Variation Coefficient (%) | 30 | 25 | 30 | 35 | 20 | 20 | 25 | 30 |
| After 7 Days (nm) | 65 | 80 | 90 | gelling | 75 | 75 | 70 | 105 |
| Variation Ratio (%) | 108 | 133 | 113 | — | 125 | 150 | 117 | 150 |

By introducing crosslinking to both the core and shell, a colored microparticle dispersion is prepared which exhibits high solvent resistance when employed as an ink-jet ink.

What is claimed is:

1. A water-based ink comprising a colored microparticle dispersion having water and a microparticle containing a resin and a colorant, wherein the microparticle has a core part and a shell part to form a core-shell structure made of resin and the core part and the shell part are cross-linked with a cross-linking agent, and the core part comprises the colorant; and the resin contained in the microparticle has a group represented by General Formula (1):

-(EO)$_m$-(PO)$_n$-(TO)$_p$-R      General Formula (1)

wherein EO represents an ethylene oxide group, PO represents a polygene oxide group, and TO represents a tetramethylene oxide group, and each is subjected to random or block copolymerization; each of the ethylene oxide group, the propylene oxide group, and the tetramethylene oxide group represented by EO, PO, and TO, respectively, may be further substituted; each of m, n, and p is an integer of 0-500 in which $2 \geq m+n+p \geq 500$ is held; and R represents a hydrogen atom, a hydroxyl group, an alkyl group, an aryl group, or a heterocyclic group.

2. The water-based ink of claim 1, wherein a polymerizable emulsifying compound is used to prepare the colored microparticle dispersion.

3. The water-based ink of claim 1, wherein a volume average diameter of the microparticles is 10 to 100 nm.

4. The water-based ink of claim 1, wherein a variation coefficient of the volume average diameter of the microparticles is not more than 80%.

5. An ink-jet ink containing the water-based ink of claim 1.

6. A method of preparing the colored microparticle dispersion of claim 1, wherein the cross-linked core-shell particle is prepared by the method comprising the steps of:

(i) dissolving a colorant and a resin in a water-insoluble organic solvent to obtain a colorant solution;

(ii) mixing the colorant solution with water and an emulsifying agent so as to obtain a colorant emulsion; and (iii) adding a crosslinking agent to the colorant emulsion so as to form the cross-linked core-shell particle.

7. A method of forming an image, comprising the step of ejecting a droplet of the ink-jet ink of claim 5 through an ink-jet head in accordance with a digital signal onto an ink receiving sheet.

* * * * *